(12) United States Patent
Horowitz et al.

(10) Patent No.: US 10,621,050 B2
(45) Date of Patent: Apr. 14, 2020

(54) METHOD AND APPARATUS FOR RESTORING DATA FROM SNAPSHOTS

(71) Applicant: MongoDB, Inc., New York, NY (US)

(72) Inventors: Eliot Horowitz, New York, NY (US); Rostislav Briskin, New Providence, NJ (US); Daniel William Gottlieb, Long Island City, NY (US)

(73) Assignee: MongoDB, Inc., New York, NY (US)

( * ) Notice: Subject to any disclaimer, the term of this patent is extended or adjusted under 35 U.S.C. 154(b) by 92 days.

(21) Appl. No.: 15/627,502

(22) Filed: Jun. 20, 2017

(65) Prior Publication Data
US 2017/0371750 A1  Dec. 28, 2017

Related U.S. Application Data

(60) Provisional application No. 62/355,087, filed on Jun. 27, 2016.

(51) Int. Cl.

| | | |
|---|---|---|
| G06F 11/14 | (2006.01) | |
| G06F 16/904 | (2019.01) | |
| G06F 16/9038 | (2019.01) | |
| G06F 16/9535 | (2019.01) | |
| G06F 16/903 | (2019.01) | |
| G06F 11/32 | (2006.01) | |
| G06F 11/30 | (2006.01) | |

(Continued)

(52) U.S. Cl.
CPC ...... *G06F 11/1469* (2013.01); *G06F 11/3089* (2013.01); *G06F 11/328* (2013.01); *G06F 16/904* (2019.01); *G06F 16/9038* (2019.01); *G06F 16/90335* (2019.01); *G06F 16/9535* (2019.01); *H04L 65/1069* (2013.01); *H04L 67/1097* (2013.01); *G06F 2201/805* (2013.01); *G06F 2201/84* (2013.01)

(58) Field of Classification Search
CPC ............... G06F 11/1469; G06F 11/328; G06F 11/3089; G06F 16/904; G06F 16/9038; G06F 16/9535
See application file for complete search history.

(56) References Cited

U.S. PATENT DOCUMENTS

| | | |
|---|---|---|
| 4,918,593 A | 4/1990 | Huber |
| 5,379,419 A | 1/1995 | Heffernan et al. |

(Continued)

OTHER PUBLICATIONS

[No Author Listed], Automated Administration Tasks (SQL Server Agent). https://docs.microsoft.com/en-us/sgl/ssms/agent/automated-adminsitration-tasks-sql-server-agent. 2 pages. [downloaded Mar. 4, 2017].

(Continued)

*Primary Examiner* — Cam Y T Truong
(74) *Attorney, Agent, or Firm* — Wolf, Greenfield & Sacks, P.C.

(57) ABSTRACT

According to at least one aspect, a database system is provided. The database system includes at least one processor configured to receive a restore request to restore a portion of a dataset to a previous state and, responsive to receipt of the restore request, identify at least one snapshot from a plurality of snapshots of at least some data in the dataset to read based on the restore request and write a portion of the data in the identified at least one snapshot to the dataset to restore the portion of the dataset to the previous state.

16 Claims, 11 Drawing Sheets

(51) Int. Cl.
*H04L 29/06* (2006.01)
*H04L 29/08* (2006.01)

(56) References Cited

U.S. PATENT DOCUMENTS

| | | | |
|---|---|---|---|
| 5,416,917 A | 5/1995 | Adair et al. |
| 5,471,629 A | 11/1995 | Risch |
| 5,551,027 A | 8/1996 | Choy et al. |
| 5,598,559 A | 1/1997 | Chaudhuri |
| 5,710,915 A | 1/1998 | McElhiney |
| 5,884,299 A | 3/1999 | Ramesh et al. |
| 5,999,179 A | 12/1999 | Kekic et al. |
| 6,065,017 A | 5/2000 | Barker |
| 6,088,524 A | 7/2000 | Levy et al. |
| 6,112,201 A | 8/2000 | Wical |
| 6,115,705 A | 9/2000 | Larson |
| 6,240,406 B1 | 5/2001 | Tannen |
| 6,240,514 B1 | 5/2001 | Inoue et al. |
| 6,249,866 B1 | 6/2001 | Brundrett et al. |
| 6,324,540 B1 | 11/2001 | Khanna et al. |
| 6,324,654 B1 | 11/2001 | Wahl et al. |
| 6,339,770 B1 | 1/2002 | Leung et al. |
| 6,351,742 B1 | 2/2002 | Agarwal et al. |
| 6,363,389 B1 | 3/2002 | Lyle et al. |
| 6,385,201 B1 | 5/2002 | Iwata |
| 6,385,604 B1 | 5/2002 | Bakalash et al. |
| 6,496,843 B1 | 12/2002 | Getchius et al. |
| 6,505,187 B1 | 1/2003 | Shatdal |
| 6,611,850 B1 * | 8/2003 | Shen .............. G06F 11/1448 |
| 6,687,846 B1 | 2/2004 | Adrangi et al. |
| 6,691,101 B2 | 2/2004 | MacNicol et al. |
| 6,801,905 B2 | 10/2004 | Andrei |
| 6,823,474 B2 | 11/2004 | Kampe et al. |
| 6,920,460 B1 | 7/2005 | Srinivasan et al. |
| 6,959,369 B1 * | 10/2005 | Ashton .............. G06F 11/1469 |
| | | 711/162 |
| 7,020,649 B2 | 3/2006 | Cochrane et al. |
| 7,032,089 B1 | 4/2006 | Ranade et al. |
| 7,082,473 B2 | 7/2006 | Breitbart et al. |
| 7,177,866 B2 | 2/2007 | Holenstein et al. |
| 7,181,460 B2 | 2/2007 | Coss et al. |
| 7,191,299 B1 | 3/2007 | Kekre et al. |
| 7,246,345 B1 | 7/2007 | Sharma et al. |
| 7,467,103 B1 | 12/2008 | Murray et al. |
| 7,472,117 B2 | 12/2008 | Dettinger et al. |
| 7,486,661 B2 | 2/2009 | Van den Boeck et al. |
| 7,548,928 B1 | 6/2009 | Dean et al. |
| 7,552,356 B1 | 6/2009 | Waterhouse et al. |
| 7,558,481 B2 | 7/2009 | Jenkins et al. |
| 7,567,991 B2 | 7/2009 | Armangau et al. |
| 7,617,369 B1 | 11/2009 | Bezbaruah et al. |
| 7,634,459 B1 | 12/2009 | Eshet et al. |
| 7,647,329 B1 | 1/2010 | Fischman et al. |
| 7,657,570 B2 | 2/2010 | Wang et al. |
| 7,657,578 B1 | 2/2010 | Karr et al. |
| 7,668,801 B1 | 2/2010 | Koudas et al. |
| 7,761,465 B1 | 7/2010 | Nonaka et al. |
| 7,957,284 B2 | 6/2011 | Lu et al. |
| 7,962,458 B2 | 6/2011 | Holenstein et al. |
| 8,005,804 B2 | 8/2011 | Greer |
| 8,005,868 B2 | 8/2011 | Saborit et al. |
| 8,037,059 B2 | 10/2011 | Bestgen et al. |
| 8,082,265 B2 | 12/2011 | Carlson et al. |
| 8,086,597 B2 | 12/2011 | Balmin et al. |
| 8,099,572 B1 * | 1/2012 | Arora .............. G06F 13/28 |
| | | 707/640 |
| 8,103,906 B1 | 1/2012 | Alibakhsh et al. |
| 8,108,443 B2 | 1/2012 | Thusoo |
| 8,126,848 B2 | 2/2012 | Wagner |
| 8,170,984 B2 | 5/2012 | Bakalash et al. |
| 8,260,840 B1 | 9/2012 | Sirota et al. |
| 8,296,419 B1 | 10/2012 | Khanna et al. |
| 8,321,558 B1 | 11/2012 | Sirota et al. |
| 8,352,450 B1 | 1/2013 | Mraz et al. |
| 8,352,463 B2 | 1/2013 | Nayak |
| 8,363,961 B1 | 1/2013 | Avidan et al. |
| 8,370,857 B2 | 2/2013 | Kamii et al. |
| 8,386,463 B2 | 2/2013 | Bestgen et al. |
| 8,392,482 B1 | 3/2013 | McAlister et al. |
| 8,572,031 B2 | 10/2013 | Merriman et al. |
| 8,589,382 B2 | 11/2013 | Betawadkar-Norwood |
| 8,589,574 B1 | 11/2013 | Cormie et al. |
| 8,615,507 B2 | 12/2013 | Varadarajulu et al. |
| 8,712,044 B2 | 4/2014 | MacMillan et al. |
| 8,712,993 B1 | 4/2014 | Ordonez |
| 8,751,533 B1 | 6/2014 | Dhavale et al. |
| 8,843,441 B1 | 9/2014 | Rath et al. |
| 8,869,256 B2 | 10/2014 | Sample |
| 8,996,463 B2 | 3/2015 | Merriman et al. |
| 9,015,431 B2 | 4/2015 | Resch et al. |
| 9,069,827 B1 | 6/2015 | Rath et al. |
| 9,116,862 B1 | 8/2015 | Rath et al. |
| 9,141,814 B1 | 9/2015 | Murray |
| 9,183,254 B1 | 11/2015 | Cole et al. |
| 9,262,462 B2 | 2/2016 | Merriman et al. |
| 9,274,902 B1 | 3/2016 | Morley et al. |
| 9,317,576 B2 | 4/2016 | Merriman et al. |
| 9,350,633 B2 | 5/2016 | Cudak et al. |
| 9,350,681 B1 | 5/2016 | Kitagawa et al. |
| 9,460,008 B1 | 10/2016 | Leshinsky et al. |
| 9,495,427 B2 | 11/2016 | Abadi et al. |
| 9,569,481 B1 | 2/2017 | Chandra et al. |
| 9,660,666 B1 | 5/2017 | Ciarlini et al. |
| 9,740,762 B2 | 8/2017 | Horowitz et al. |
| 9,792,322 B2 | 10/2017 | Merriman et al. |
| 9,805,108 B2 | 10/2017 | Merriman et al. |
| 9,881,034 B2 | 1/2018 | Horowitz et al. |
| 9,959,308 B1 | 5/2018 | Carman et al. |
| 10,031,931 B2 | 7/2018 | Horowitz et al. |
| 10,031,956 B2 | 7/2018 | Merriman et al. |
| 10,262,050 B2 | 4/2019 | Bostic et al. |
| 10,346,430 B2 | 7/2019 | Horowitz et al. |
| 10,346,434 B1 | 7/2019 | Morkel et al. |
| 10,366,100 B2 | 7/2019 | Horowitz et al. |
| 10,372,926 B1 | 8/2019 | Leshinsky et al. |
| 10,394,822 B2 | 8/2019 | Stearn et al. |
| 10,423,626 B2 | 9/2019 | Stearn et al. |
| 10,430,433 B2 | 10/2019 | Stearn et al. |
| 2001/0021929 A1 | 9/2001 | Lin et al. |
| 2002/0029207 A1 | 3/2002 | Bakalash et al. |
| 2002/0143901 A1 | 10/2002 | Lupo et al. |
| 2002/0147842 A1 | 10/2002 | Breitbart et al. |
| 2002/0184239 A1 | 12/2002 | Mosher, Jr. et al. |
| 2003/0046307 A1 | 3/2003 | Rivette et al. |
| 2003/0084073 A1 | 5/2003 | Hotti et al. |
| 2003/0088659 A1 | 5/2003 | Susarla et al. |
| 2003/0182427 A1 | 9/2003 | Halpern |
| 2003/0187864 A1 | 10/2003 | McGoveran |
| 2004/0078569 A1 | 4/2004 | Hotti |
| 2004/0133591 A1 | 7/2004 | Holenstein et al. |
| 2004/0168084 A1 | 8/2004 | Owen et al. |
| 2004/0186817 A1 | 9/2004 | Thames et al. |
| 2004/0186826 A1 | 9/2004 | Choi et al. |
| 2004/0205048 A1 | 10/2004 | Pizzo et al. |
| 2004/0236743 A1 | 11/2004 | Blaicher et al. |
| 2004/0254919 A1 | 12/2004 | Giuseppini |
| 2005/0033756 A1 | 2/2005 | Kottomtharayil et al. |
| 2005/0038833 A1 | 2/2005 | Colrain et al. |
| 2005/0192921 A1 | 9/2005 | Chaudhuri et al. |
| 2005/0234841 A1 | 10/2005 | Miao et al. |
| 2005/0283457 A1 | 12/2005 | Sonkin et al. |
| 2006/0004746 A1 | 1/2006 | Angus et al. |
| 2006/0020586 A1 | 1/2006 | Prompt et al. |
| 2006/0085541 A1 | 4/2006 | Cuomo et al. |
| 2006/0090095 A1 | 4/2006 | Massa et al. |
| 2006/0168154 A1 | 7/2006 | Zhang et al. |
| 2006/0209782 A1 | 9/2006 | Miller et al. |
| 2006/0218123 A1 | 9/2006 | Chowdhuri et al. |
| 2006/0235905 A1 | 10/2006 | Kapur |
| 2006/0288232 A1 | 12/2006 | Ho et al. |
| 2006/0294129 A1 | 12/2006 | Stanfill et al. |
| 2007/0050436 A1 | 3/2007 | Chen et al. |
| 2007/0061487 A1 | 3/2007 | Moore et al. |
| 2007/0094237 A1 | 4/2007 | Mitchell et al. |

(56) References Cited

U.S. PATENT DOCUMENTS

| | | |
|---|---|---|
| 2007/0203944 A1 | 8/2007 | Batra et al. |
| 2007/0226640 A1 | 9/2007 | Holbrook et al. |
| 2007/0233746 A1 | 10/2007 | Garbow et al. |
| 2007/0240129 A1 | 10/2007 | Kretzschmar et al. |
| 2008/0002741 A1 | 1/2008 | Maheshwari et al. |
| 2008/0071755 A1 | 3/2008 | Barsness et al. |
| 2008/0098041 A1* | 4/2008 | Chidambaran ....... G06F 16/252 |
| 2008/0140971 A1 | 6/2008 | Dankel et al. |
| 2008/0162590 A1 | 7/2008 | Kundu et al. |
| 2008/0288646 A1 | 11/2008 | Hasha et al. |
| 2009/0030986 A1 | 1/2009 | Bates |
| 2009/0055350 A1 | 2/2009 | Branish et al. |
| 2009/0077010 A1 | 3/2009 | Muras et al. |
| 2009/0094318 A1 | 4/2009 | Gladwin et al. |
| 2009/0222474 A1 | 9/2009 | Alpern et al. |
| 2009/0240744 A1 | 9/2009 | Thomson et al. |
| 2009/0271412 A1 | 10/2009 | Lacapra et al. |
| 2010/0011026 A1 | 1/2010 | Saha et al. |
| 2010/0030793 A1 | 2/2010 | Cooper et al. |
| 2010/0030800 A1 | 2/2010 | Brodfuehrer et al. |
| 2010/0049717 A1 | 2/2010 | Ryan et al. |
| 2010/0058010 A1* | 3/2010 | Augenstein ......... G06F 11/1451 |
| | | 711/162 |
| 2010/0106934 A1 | 4/2010 | Calder et al. |
| 2010/0161492 A1 | 6/2010 | Harvey et al. |
| 2010/0198791 A1 | 8/2010 | Wu et al. |
| 2010/0205028 A1 | 8/2010 | Johnson et al. |
| 2010/0235606 A1 | 9/2010 | Oreland et al. |
| 2010/0250930 A1 | 9/2010 | Csaszar et al. |
| 2010/0333111 A1 | 12/2010 | Kothamasu |
| 2010/0333116 A1 | 12/2010 | Prahlad et al. |
| 2011/0022642 A1 | 1/2011 | deMilo et al. |
| 2011/0125704 A1 | 5/2011 | Mordinova et al. |
| 2011/0125766 A1 | 5/2011 | Carozza |
| 2011/0125894 A1 | 5/2011 | Anderson et al. |
| 2011/0138148 A1 | 6/2011 | Friedman et al. |
| 2011/0202792 A1 | 8/2011 | Atzmony |
| 2011/0225122 A1 | 9/2011 | Denuit et al. |
| 2011/0225123 A1 | 9/2011 | D'Souza et al. |
| 2011/0231447 A1 | 9/2011 | Starkey |
| 2011/0246717 A1 | 10/2011 | Kobayashi et al. |
| 2012/0054155 A1 | 3/2012 | Darcy |
| 2012/0076058 A1 | 3/2012 | Padmanabh et al. |
| 2012/0078848 A1 | 3/2012 | Jennas et al. |
| 2012/0079224 A1 | 3/2012 | Clayton et al. |
| 2012/0084414 A1 | 4/2012 | Brock et al. |
| 2012/0109892 A1 | 5/2012 | Novik et al. |
| 2012/0109935 A1 | 5/2012 | Meijer |
| 2012/0130988 A1 | 5/2012 | Nica et al. |
| 2012/0136835 A1 | 5/2012 | Kosuru et al. |
| 2012/0138671 A1 | 6/2012 | Gaede et al. |
| 2012/0158655 A1 | 6/2012 | Dove et al. |
| 2012/0159097 A1 | 6/2012 | Jennas, II et al. |
| 2012/0166390 A1* | 6/2012 | Merriman ............ G06F 11/1458 |
| | | 707/613 |
| 2012/0166517 A1 | 6/2012 | Lee et al. |
| 2012/0198200 A1 | 8/2012 | Li et al. |
| 2012/0221540 A1 | 8/2012 | Rose et al. |
| 2012/0254175 A1 | 10/2012 | Horowitz et al. |
| 2012/0274664 A1 | 11/2012 | Fagnou |
| 2012/0320914 A1 | 12/2012 | Thyni et al. |
| 2013/0151477 A1* | 6/2013 | Tsaur ................. G06F 11/1469 |
| | | 707/679 |
| 2013/0290249 A1 | 10/2013 | Merriman et al. |
| 2013/0290471 A1 | 10/2013 | Venkatesh |
| 2013/0332484 A1 | 12/2013 | Gajic |
| 2013/0339379 A1 | 12/2013 | Ferrari et al. |
| 2013/0346366 A1 | 12/2013 | Ananthanarayanan et al. |
| 2014/0013334 A1 | 1/2014 | Bisdikian et al. |
| 2014/0032525 A1 | 1/2014 | Merriman et al. |
| 2014/0032579 A1 | 1/2014 | Merriman et al. |
| 2014/0032628 A1 | 1/2014 | Cudak et al. |
| 2014/0074790 A1* | 3/2014 | Berman .............. G06F 11/1448 |
| | | 707/649 |
| 2014/0101100 A1 | 4/2014 | Hu et al. |
| 2014/0164831 A1 | 6/2014 | Merriman et al. |
| 2014/0258343 A1 | 9/2014 | Nikula |
| 2014/0279929 A1 | 9/2014 | Gupta et al. |
| 2014/0280380 A1 | 9/2014 | Jagtap et al. |
| 2015/0074041 A1 | 3/2015 | Bhattacharjee et al. |
| 2015/0081766 A1 | 3/2015 | Curtis et al. |
| 2015/0242531 A1 | 8/2015 | Rodniansky |
| 2015/0278295 A1 | 10/2015 | Merriman et al. |
| 2015/0301901 A1 | 10/2015 | Rath et al. |
| 2015/0331755 A1* | 11/2015 | Morgan .............. G06F 11/1451 |
| | | 707/646 |
| 2015/0341212 A1 | 11/2015 | Hsiao et al. |
| 2015/0378786 A1 | 12/2015 | Suparna et al. |
| 2016/0048345 A1 | 2/2016 | Vijayrao et al. |
| 2016/0110284 A1* | 4/2016 | Athalye .............. G06F 16/2455 |
| | | 711/120 |
| 2016/0110414 A1 | 4/2016 | Park et al. |
| 2016/0162374 A1* | 6/2016 | Mutha ..................... G06F 3/06 |
| | | 714/19 |
| 2016/0188377 A1 | 6/2016 | Thimmappa et al. |
| 2016/0203202 A1 | 7/2016 | Merriman et al. |
| 2016/0246861 A1 | 8/2016 | Merriman et al. |
| 2016/0306709 A1 | 10/2016 | Shaull |
| 2016/0323378 A1 | 11/2016 | Coskun et al. |
| 2016/0364440 A1 | 12/2016 | Lee et al. |
| 2017/0032007 A1 | 2/2017 | Merriman |
| 2017/0032010 A1 | 2/2017 | Merriman |
| 2017/0091327 A1 | 3/2017 | Bostic et al. |
| 2017/0109398 A1 | 4/2017 | Stearn |
| 2017/0109399 A1 | 4/2017 | Stearn et al. |
| 2017/0109421 A1 | 4/2017 | Stearn et al. |
| 2017/0169059 A1 | 6/2017 | Horowitz et al. |
| 2017/0262516 A1 | 9/2017 | Horowitz et al. |
| 2017/0262517 A1 | 9/2017 | Horowitz et al. |
| 2017/0262519 A1 | 9/2017 | Horowitz et al. |
| 2017/0262638 A1 | 9/2017 | Horowitz et al. |
| 2017/0264432 A1 | 9/2017 | Horowitz et al. |
| 2017/0270176 A1 | 9/2017 | Horowitz et al. |
| 2017/0286510 A1 | 10/2017 | Horowitz et al. |
| 2017/0286516 A1 | 10/2017 | Horowitz et al. |
| 2017/0286517 A1 | 10/2017 | Horowitz et al. |
| 2017/0286518 A1 | 10/2017 | Horowitz et al. |
| 2017/0322954 A1 | 11/2017 | Horowitz et al. |
| 2017/0322996 A1 | 11/2017 | Horowitz et al. |
| 2017/0344290 A1 | 11/2017 | Horowitz et al. |
| 2017/0344441 A1 | 11/2017 | Horowitz et al. |
| 2017/0344618 A1 | 11/2017 | Horowitz et al. |
| 2017/0371968 A1 | 12/2017 | Horowitz et al. |
| 2018/0004804 A1 | 1/2018 | Merriman et al. |
| 2018/0095852 A1 | 4/2018 | Keremane et al. |
| 2018/0096045 A1 | 4/2018 | Merriman et al. |
| 2018/0165338 A1 | 6/2018 | Kumar et al. |
| 2018/0300209 A1 | 10/2018 | Rahut |
| 2018/0300381 A1 | 10/2018 | Horowitz et al. |
| 2018/0300385 A1 | 10/2018 | Merriman et al. |
| 2018/0314750 A1 | 11/2018 | Merriman et al. |
| 2018/0343131 A1 | 11/2018 | George et al. |
| 2018/0365114 A1 | 12/2018 | Horowitz |
| 2019/0102410 A1 | 4/2019 | Horowitz et al. |
| 2019/0303382 A1 | 10/2019 | Bostic et al. |

OTHER PUBLICATIONS

Chang et al., Bigtable: a distributed storage system for structured data. OSDI'06: Seventh Symposium on Operating System Design and Implementation. Nov. 2006.

Cooper et al., PNUTS: Yahoo!'s hosted data serving platform. VLDB Endowment. Aug. 2008.

Decandia et al., Dynamo: Amazon's highly available key-value store. SOSP 2007. Oct. 2004.

Nelson et al., Automate MongoDB with MMS. PowerPoint Presentation. Published Jul. 24, 2014. 27 slides. http://www.slideshare.net/mongodb/mms-automation-mongo-db-world.

Poder, Oracle living books. 2009. <http://tech.e2sn.com/oracle/sql/oracle-execution-plan-operation-reference>.

Stirman, Run MongoDB with Confidence using MMS. PowerPoint Presentation. Published Oct. 6, 2014. 34 slides. http://www.slideshare.

(56) References Cited

OTHER PUBLICATIONS net/mongodb/mongo-db-boston-run-mongodb-with-mms-20141001.
Van Renesse et al., Chain replication for supporting high throughput and availability. OSDI. 2004: 91-104.
Walsh et al., Xproc: An XML Pipeline Language. May 11, 2011. <https://www.w3.org/TR/xproc/>.
Wikipedia, Dataflow programming Oct. 2011. <http://en.wikipedia.org/wiki/Dataflow_programming>.
Wikipedia, Pipeline (Unix). Sep. 2011. <http://en.wikipedia.org/wiki/Pipeline (Unix)>.
Wilkins et al., Migrate DB2 applications to a partitioned database. developerWorks, IBM. Apr. 24, 2008, 33 pages.
U.S. Appl. No. 16/294,227, filed Mar. 6, 2019, Bostic et al.
U.S. Appl. No. 16/525,447, filed Jul. 29, 2019, Horowitz et al.
U.S. Appl. No. 16/456,685, filed Jun. 28, 2019, Horowitz et al.
U.S. Appl. No. 16/588,739, filed Sep. 30, 2019, Stearn et al.
U.S. Appl. No. 15/074,987, filed Mar. 18, 2016, Merriman.
U.S. Appl. No. 15/654,590, filed Jul. 19, 2017, Horowitz et al.
U.S. Appl. No. 15/706,593, filed Sep. 15, 2017, Merriman et al.
U.S. Appl. No. 15/721,176, filed Sep. 29, 2017, Merriman et al.
U.S. Appl. No. 15/200,721, filed Jul. 1, 2016, Merriman.
U.S. Appl. No. 15/200,975, filed Jul. 1, 2016, Merriman.
U.S. Appl. No. 14/992,225, filed Jan. 11, 2016, Bostic et al.
U.S. Appl. No. 16/035,370, filed Jul. 13, 2018, Horowitz et al.
U.S. Appl. No. 15/605,512, filed May 25, 2017, Horowitz et al.
U.S. Appl. No. 15/605,143, filed May 25, 2017, Horowitz.
U.S. Appl. No. 15/605,391, filed May 25, 2017, Horowitz.
U.S. Appl. No. 15/390,345, filed Dec. 23, 2016, Stearn et al.
U.S. Appl. No. 15/390,351, filed Dec. 23, 2016, Stearn et al.
U.S. Appl. No. 15/390,364, filed Dec. 23, 2016, Stearn et al.
U.S. Appl. No. 15/604,879, filed May 25, 2017, Horowitz.
U.S. Appl. No. 15/604,856, filed May 25, 2017, Horowitz et al.
U.S. Appl. No. 15/605,141, filed May 25, 2017, Horowitz et al.
U.S. Appl. No. 15/605,276, filed May 25, 2017, Horowitz et al.
U.S. Appl. No. 15/605,372, filed May 25, 2017, Horowitz et al.
U.S. Appl. No. 15/605,426, filed May 25, 2017, Horowitz et al.
U.S. Appl. No. 15/627,672, filed Jun. 20, 2017, Horowitz et al.
U.S. Appl. No. 16/013,345, filed Jun. 20, 2018, Horowitz.
U.S. Appl. No. 15/627,613, filed Jun. 20, 2017, Horowitz et al.
U.S. Appl. No. 15/627,631, filed Jun. 20, 2017, Horowitz et al.
U.S. Appl. No. 15/627,645, filed Jun. 20, 2017, Horowitz et al.
U.S. Appl. No. 15/627,656, filed Jun. 20, 2017, Horowitz et al.
U.S. Appl. No. 16/013,720, filed Jun. 20, 2018, Horowitz et al.
U.S. Appl. No. 16/013,706, filed Jun. 20, 2018, Merriman et al.
U.S. Appl. No. 16/013,725, filed Jun. 20, 2018, Merriman et al.
Ongaro et al., In Search of an Understandable Consensus Algorithm. Proceedings of USENIX ATC '14: 2014 USENIX Annual Technical Conference. Philadelphia, PA. Jun. 19-20, 2014; pp. 305-320.

\* cited by examiner

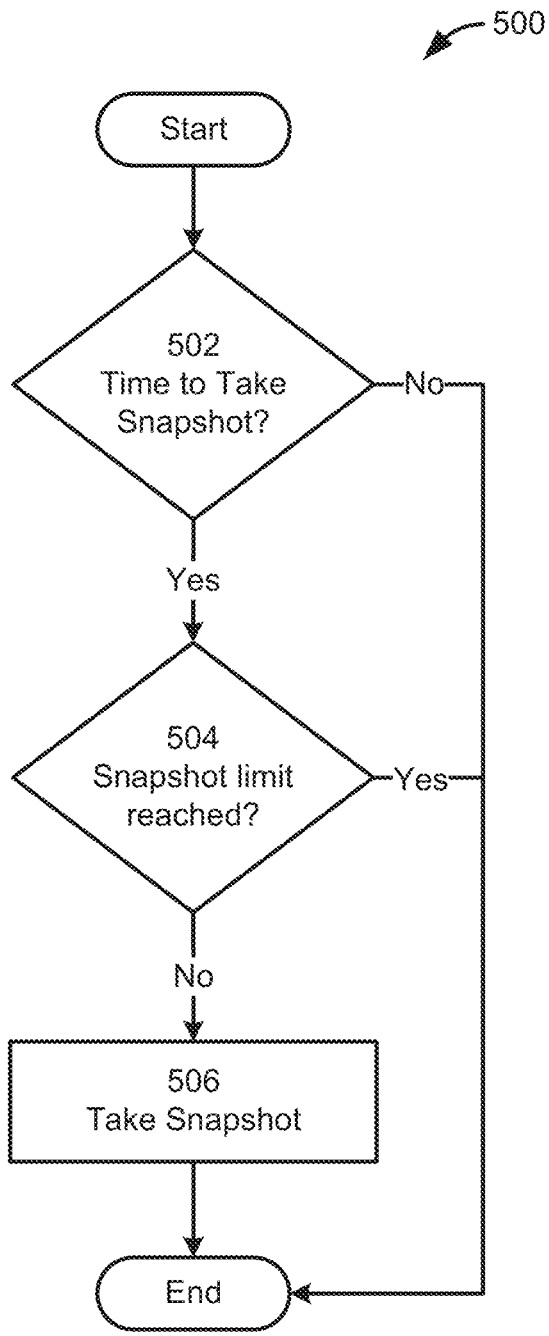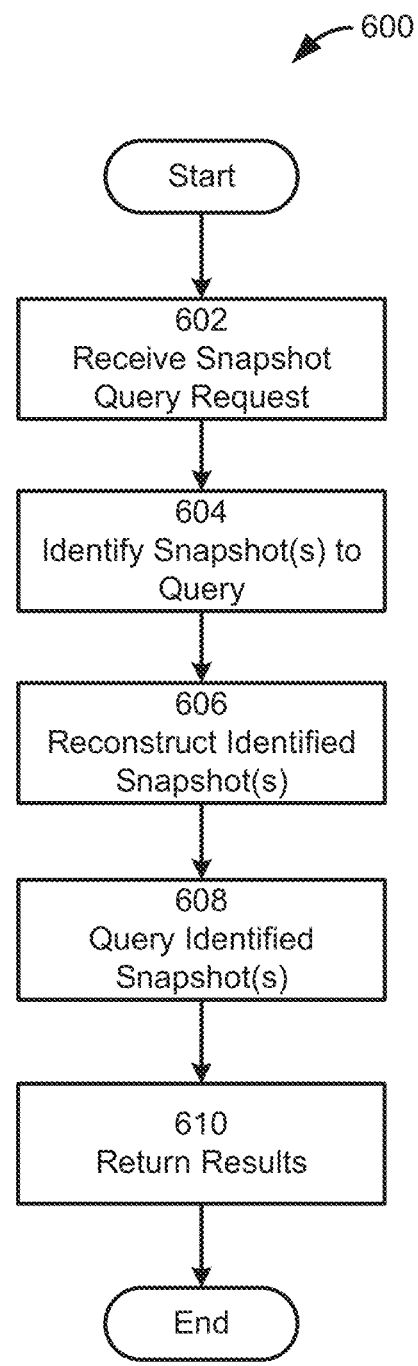
FIG. 5
FIG. 6

METHOD AND APPARATUS FOR RESTORING DATA FROM SNAPSHOTS

RELATED APPLICATIONS

This Application claims priority under 35 U.S.C. § 119(e) to U.S. Provisional Application Ser. No. 62/355,087, titled "SYSTEMS AND METHODS FOR MANAGING DISTRIBUTED DATABASE DEPLOYMENTS" filed on Jun. 27, 2016, which is herein incorporated by reference in its entirety.

BACKGROUND

Databases may include multiple disks to store redundant data. The redundant storage of data in multiple disks may improve the rate at which data can be read from the database by spreading out read requests over multiple disks or systems. Further, the redundant storage of data may improve uptime of the database by making the database more robust to failures.

SUMMARY

According to at least one aspect, a system is provided. The system comprises at least one processor configured to: receive a first restore request to restore a portion of a dataset to a first previous state; and responsive to receipt of the first restore request, identify at least one first snapshot from a plurality of snapshots of at least some data in the dataset to read based on the first restore request; and write a portion of the data in the identified at least one first snapshot to the dataset to restore the portion of the dataset to the first previous state.

In some embodiments, the at least one processor is further configured to generate the plurality of snapshots. In some embodiments, the at least one processor is further configured to generate a new snapshot of the dataset periodically.

In some embodiments, the first restore request comprises a query and wherein the at least one processor is further configured to execute the query on the identified at least one first snapshot to generate query results and write at least a portion of the query results to the dataset. In some embodiments, the at least one processor is configured to: receive a second restore request to restore the entire dataset to a second previous state; and responsive to receipt of the second restore request, identify at least one second snapshot from the plurality of snapshots to read based on the second restore request; and write data in the identified at least one second snapshot to the dataset to restore the entire dataset to a second previous state.

In some embodiments, each snapshot of the plurality of snapshots corresponds to data stored in the dataset at a unique point in time. In some embodiments, the at least one processor is configured to: receive a snapshot query requesting information in a second previous state of the dataset; and responsive to receipt of the snapshot query, execute a query on at least one second snapshot from the plurality of snapshot to generate query results; and return the query results. In some embodiments, the plurality of snapshots are stored in at least one database in a read-only format. In some embodiments, the at least one processor is configured to access the plurality of snapshots using a first storage engine and access the dataset using a second storage engine that is different from the first storage engine.

In some embodiments, the system further comprises a database configured to store the dataset and follow an eventual consistency model. In some embodiments, the database comprises a primary data storage node that includes an operation log and at least one secondary data storage node configured to retrieve the operation log and replicate operations in the operation log.

According to at least one aspect, a method of performing operations in at least one computer database is provided. The method comprises storing, in the at least one computer database, a dataset and a plurality of snapshots of at least some data in the dataset; receiving, by at least one processor coupled to the at least one computer database, a first request to restore a portion of the dataset to a first previous state; responsive to receiving the first restore request, identifying at least one first snapshot from a plurality of snapshots of at least some data in the dataset to read based on the first restore request; and writing a portion of the data in the identified at least one first snapshot to the dataset to restore the portion of the dataset to the first previous state.

In some embodiments, the method further comprises generating the plurality of snapshots. In some embodiments, the method further comprises generating new snapshots of the dataset periodically.

In some embodiments, the first restore request comprises a query and wherein the method further comprises executing the query on the identified at least one first snapshot to generate query results and writing at least a portion of the query results to the dataset. In some embodiments, the method further comprises receiving a second restore request to restore the entire dataset to a second previous state; and responsive to receiving the second restore request, identifying at least one second snapshot from the plurality of snapshots to read based on the second restore request; and writing data in the identified at least one second snapshot to the dataset to restore the entire dataset to a second previous state.

In some embodiments, each snapshot of the plurality of snapshots corresponds to data stored in the dataset at a unique point in time. In some embodiments, the method further comprises receiving a snapshot query requesting information in a second previous state of the dataset; and responsive to receiving the snapshot query, executing a query on at least one second snapshot from the plurality of snapshot to generate query results; and returning the query results.

In some embodiments, storing the dataset comprises storing the dataset in a primary data storage node and replicating the dataset in at least one secondary data storage node.

According to at least one aspect, a database system is provided. The database system comprises a first database comprising at least one replica set configured to store a dataset in the at least one replica set; and a second database configured to store a plurality of snapshots of at least some data in the dataset in a compressed form; and at least one processor coupled to the first and second databases. The at least one processor is configured to: receive a restore request comprising a query to restore a portion of the dataset that matches the query to a previous state; and responsive to receipt of the restore request, identify at least one snapshot from the plurality of snapshots to read based on the restore request; decompress the identified at least one snapshot stored in a compressed form; execute, using a first storage engine, the query on the decompressed at least one snapshot to generate query results; and write, using a second storage engine that is different from the first storage engine, at least some of the query results to the dataset to restore the portion of the dataset that matches the query to the previous state.

BRIEF DESCRIPTION OF THE DRAWINGS

Various aspects of at least one embodiment are discussed herein with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

FIG. 5 is a flowchart showing an example snapshot generation process, according to some embodiments;

FIG. 6 is a flowchart showing an example snapshot query process, according to some embodiments;

DETAILED DESCRIPTION

Figure 1:
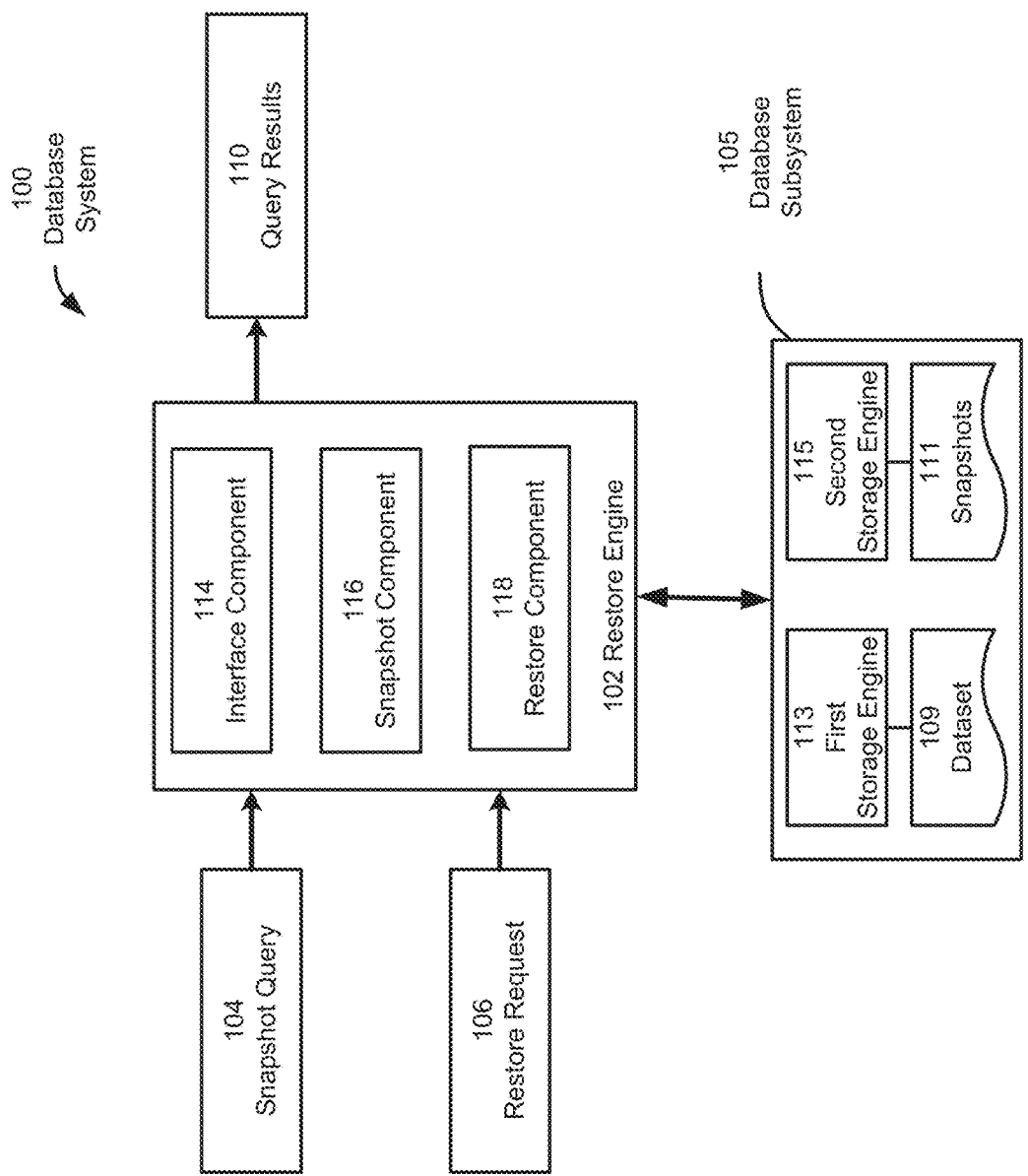
FIG. 1 illustrates a block diagram of an example restore engine configured to process snapshot queries and restore requests, according to some embodiments.

Database users may need to restore data in a dataset to a previous state. For example, a database user may have inadvertently deleted one or more documents in the dataset. In some instances, a database user may lose the entire dataset and require a full restore of the entire data set. However, database users usually only lose a portion of the data in the dataset. For example, a subset of the documents in the dataset may have been improperly overwritten and a database user may only want to restore the improperly modified documents while leaving the remaining documents in the dataset untouched.

Accordingly, the inventors have conceived and developed new techniques for restoring portions of data in a dataset to a previous state. In some embodiments, information regarding previous states of data in the dataset may be stored in a plurality of snapshots. Each of the snapshots may be indicative of a state of the data in the dataset at a previous point in time. These snapshots may be queried to obtain a subset of the data in the dataset at a previous point in time. The results of such queries (e.g., a subset of the data in the dataset at a previous point in time) may be directly employed to restore a portion of the data dataset. Such partial restore functionality may be referred to as "query-able backup" functionality.

The partial restore techniques described herein are computationally more efficient than previous approaches to restoring only a portion of a dataset. Previously, a system would restore the entire dataset to a previous state and subsequently modify documents in the restored dataset that a database user wanted unchanged to bring them back up-to-date. The partial restore techniques described herein avoid modifying documents in the restored dataset by only restoring the desired portion of the dataset. Thereby, these partial restore techniques require fewer computer operations than previous techniques and, therefore, are more computationally efficient.

Examples of the methods, devices, and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Example Database Restore Engine

FIG. 1 shows an example database system 100 comprising a restore engine 102, according to some embodiments, that may be executed by one or more processors. The restore engine 102 may be configured to restore all or any portion of the data in a dataset 109 in a database subsystem 105 to a previous state. The database system 100 may store information regarding previous states of the dataset 109 via snapshots 111 in the database subsystem 105. The snapshots 111 may each be representative of a state of data in the dataset 109 at a particular point in time. The restore engine 102 may employ these snapshots 111 to restore all or any portion of data stored in the dataset 109 to a previous state in response to a restore request 106. Additionally (or alternatively), the restore engine 102 may also support direct queries on the snapshots 111 in the dataset 109 through snapshot queries 104. The results of such a query may be output as query results 110.

As shown in FIG. 1, the restore engine 102 includes an interface component 114. In some embodiments, the interface component 114 receives the snapshot query 104 and provides the query results 110 once the query have been executed against one or more snapshots 111. The interface component 114 may also receive the restore request 106 that may be executed by the restore engine 102. The restore request 106 may be, for example, a full restore request to restore all of the data in the dataset 109 to a previous state or a partial restore request to restore a portion of the data in the dataset 109 to a previous state. The interface component 114 may receive and/or provide data to one or more systems (such as storage subsystem 105) and/or database users. For example, the interface component 114 may provide a user interface through a web-portal that allows a database user to initiate a snapshot query 104, initial a restore request 106, and/or view query results 110.

The restore engine 102 may include a snapshot component 116 to generate (and/or delete) snapshots 111 that are each indicative of a state of data in the dataset 109 at a particular point in time (e.g., a unique point in time) on a logical clock. For example, the snapshot component 116 may generate a snapshot of the dataset 109 consistent with a schedule for taking and/or deleting snapshots and each snapshot may be representative of the state of the data in the dataset 109 at the time the snapshot 111 was taken. The schedule may vary based on the particular implementation. For example, the schedule may be a periodic schedule where the time between snapshots is consistent (e.g., snapshots are captured every minute) or an aperiodic schedule where the time between the snapshots is inconsistent (e.g., snapshots are captured at 10:00 am and 2:00 pm each day). It should be appreciated that, in some embodiments, the schedule may be user configurable (e.g., via a user interface generated by interface component 114). For example, a database user may specify when snapshots should be captured (e.g., every day at 12:00 pm) and/or when snapshots be deleted (e.g., delete snapshots that are more than 7 days old).

It should be appreciated that the snapshots 111 may be captured at unique points in time on both a logical clock and a physical clock in cases where the time difference between the captured snapshots 111 is larger than the resolution of the physical clock. For example, the snapshots 111 may be captured every 5 minutes and the resolution of the physical clock may be 1 minute. In this example, each of the snapshots 111 may be generated at both a unique point in time on a logical clock and a unique point in time on the physical clock.

In some embodiments, the snapshots 111 may be stored using different techniques than the dataset 109. For example, the dataset 109 may be accessed (e.g., read from and/or written to) frequently and stored in an uncompressed form to allow fast access. Conversely, the snapshots 111 may be read infrequently and stored in a compressed form (e.g., as de-duplicated blocks) to reduce the size of the snapshots 111. Further, the dataset 109 and the snapshots 111 may be stored in different databases with different configurations. For example, the dataset 109 may be stored in a database that follows an eventual consistency model and comprises one or more replica sets. In this example, the snapshots 111 may be stored in a different database that follows a different consistency model. The database storing the snapshots 111 may even have a different physical location than the database storing the dataset 109. For example, the database storing the dataset 109 may be on a local non-transitory computer readable medium and the snapshots 111 may be stored in a database offered by a cloud storage service, such as AMAZON S3, GOOGLE CLOUD STORAGE, RACKSPACE CLOUD STORAGE, and/or MS AZURE CLOUD SERVICES. Still yet further, the dataset 109 and the snapshots 111 may have different read/write permissions. For example, the dataset 109 may be stored in a format that permits both read and write operations while the snapshots 111 may be stored in a format the only permits read operations.

In some embodiments, the restore engine 102 may access the dataset 109 and snapshots 111 using different storage engines as illustrated by first and second storage engines 113 and 115, respectively. For example, the first storage engine 111 may be configured to create, read, update, and/or delete data from the dataset 109 and the second storage engine 115 may be configured to create, read, update, and/or delete data from the snapshots 111. Employing separate storages engines for the first dataset 109 and the snapshots 111 may provide various advantages. For example, employing different storage engines may allow manipulation of the snapshots 111 without interfering with operations associated with the dataset 109 (such as regular read and write operations as the dataset 109 is being used). Further, employing different storage engines may allow the data in the dataset 109 to be accessed differently than the data in the snapshots 111. For example, the first storage engine 113 may directly perform operations on the dataset 109 (e.g., because the dataset 109 is uncompressed) while the second storage engine 115 may need to reconstruct a snapshot 111 prior to performing one or more operations on the snapshot 111 (e.g., because the snapshots 111 are stored in a compressed form) such as reading from the snapshot 111 and/or querying the snapshot 111.

It should be appreciated that the dataset 109 and the snapshots 111 may be stored in the same database, stored in the same form (e.g., compressed or uncompressed), and/or use the same storage engine. For example, the dataset 109 and snapshots 111 may both be stored in replica sets in a database that is configured to follow an eventual consistency model. In this example, the database subsystem 105 may employ a one or more storage engines to access the dataset 109 and/or the snapshots 111.

The restore engine 102 may further include a restore component 118 that is configured to process snapshot queries 104. A snapshot query 104 may comprise, for example, a query to be processed against one or more snapshots 111. Thereby, the restore engine 102 may replicate the results of a query to the dataset 109 at a previous point in time (e.g., yesterday, last week, or last month). The restore component 118 may be configured to process the snapshot query 104 by, for example, identifying one or more snapshots 111 to query and triggering the second storage engine 115 to execute the query against the identified snapshots 111. The second storage engine 115 may execute the query by, for example, reconstructing the identified snapshots 111 and executing the query against the reconstructed snapshots 111 to generate the query results 110.

The restore component 118 may also be configured to process restore requests 106. The restore request 106 may be, for example, a full restore request indicating that all of the data in the dataset 109 should be restored to a previous state or a partial restore request indicating that only a portion of the data in the dataset 109 should be restored to a previous state. The restore component 118 may be configured to process these requests by identifying a type of the restore request 106 (e.g., whether the restore request 106 is a full restore request or a partial restore request). If the restore request 106 is a full restore request, the restore component 118 may identify one or more snapshots 111 to restore the dataset 109 and trigger the second storage engine 115 to reconstruct the identified one or more snapshots 111. Once the one or more snapshots 111 are reconstructed, the restore component 118 may trigger the first storage engine 113 to write all (or any portion of) of the data from the reconstructed one or more snapshots 111 to the dataset 109 to restore the entire dataset 109 to the previous state exhibited in the identified one or more snapshots 111. If the restore request 106 is a partial restore request, the restore component 118 may identify one or more snapshots 111 to use to restore the dataset 109 and trigger the second storage engine 115 to reconstruct the identified one or more snapshots 111. Once the one or more snapshots 111 are reconstructed, the restore component 118 may trigger the second storage engine 115 to query the reconstructed one or more snapshots to identify documents that should be restored to the dataset 109. After the documents to restore have been identified, the restore component 118 may be configured to trigger the first storage engine 113 to write all (or any portion of) the identified documents to the dataset 109 to restore only a portion of the dataset 109 to the previous state exhibited in the identified one or more snapshots.

Having described an example database system 100, it should be appreciated that this database system may be implemented in any of a variety of ways. In some implementations, the database system 100 may be part of a cloud storage system that is configured to provide a cloud service for running, monitoring, and maintaining distributed database deployments. In such an implementation, the restore and/or direct snapshot query functionality may be integrated into the cloud storage system and made accessible to a database user via a web-portal. In other implementations, the database system 100 is implemented as part of a local storage system.

Example Database Systems

Figure 2:
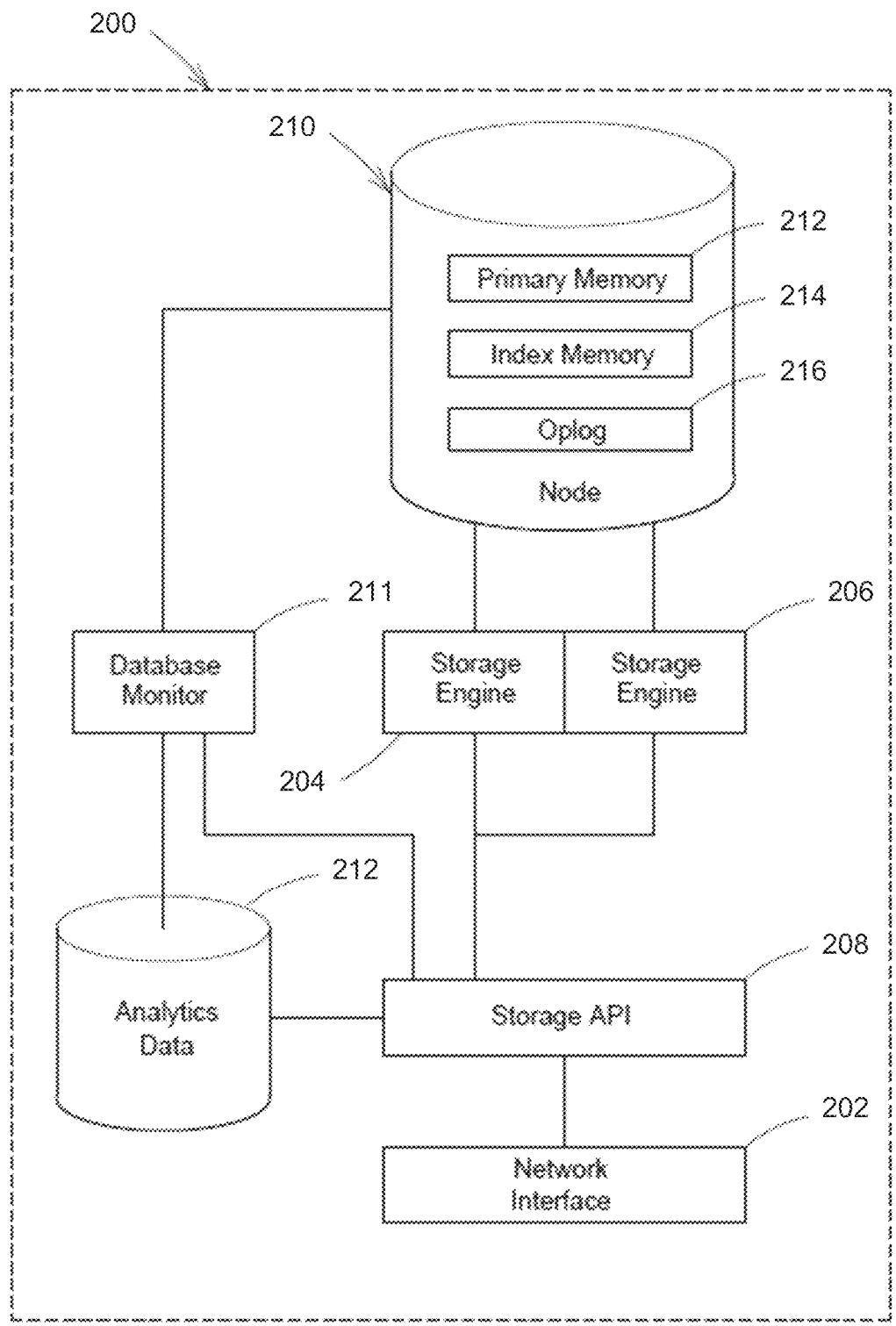
FIG. 2 illustrates a block diagram of an example distributed database system, according to some embodiments.

An example of a database subsystem 200 is shown in FIG. 2 that may be implemented in cloud storage system and/or a local storage system. The database subsystem 200 is one example implementation of all or any portion of the database subsystem 105 in FIG. 1. The database subsystem 200 includes an interface 202 for sending and receiving information (including database requests and responses thereto) to router processes, database clients, or other components or entities in the system. In one embodiment, the backend architecture is configured to interact with any data model provided by a managed database. For example, the managed database can include a non-relational data model. In another embodiment, the data model can be implemented in the form of replica sets as described in U.S. patent application Ser. No. 12/977,563, which is hereby incorporated by reference in its entirety. The database subsystem 200 includes a storage application. In one implementation described in greater detail below, a base unit of data is a document.

In some embodiments, a storage application programming interface (API) 208 receives database requests, including requests to perform read and write operations. When a write operation is requested, the storage API 208 in response selectively triggers a first storage engine 204 or a second storage engine 206 configured to store data in a first data format or second data format, respectively, in node 210. As discussed in more detail below, a database monitor 211 may track a number of analytics about the database. In some embodiments, the database monitor 211 is configured to track the operations performed on the data over time, and stores that information as analytics data 213. In some examples, analytic data may be stored in a separate database. In other examples, the analytics data is stored as a name collection (i.e., a logical grouping of data). These analytics may be provided to the storage API 208, which relies on the analytics to selectively actuate an appropriate storage engine. In further embodiments, although multiple storage engines are provided, not all storage engines may operate with snapshots. Responsive to a command execution that includes operations involving snapshots, the system may force use of a particular storage engine or alternatively provide error information that the current storage engine does not support the functionality. Thus, the system can be configured to check capability of storage engines to support certain functions (e.g., snapshot read functions) and report on the same to end users.

In one example, the database monitor 211 tracks the relative number of read and write operations performed on a collection within the database. In another example, the database monitor 211 is configured to track any operations (e.g., reads, writes, etc.) performed on any base unit of data (e.g., documents) in the database.

In some embodiments, the storage API 208 uses the tracked data (e.g., analytics data) collected by the database monitor 211 and/or the analytics data 213 to select an optimal storage engine for a database, a collection, or a document having the observed read/write ratio. In one example, the storage API 208 is mapped to the selected storage engine. For example, an identifier of the selected storage engine may be stored in a location in memory or on disk; when a write operation request is received by the storage API 208, the identifier is used to identify and activate the storage engine. Alternatively, elements of the database can specify a mapping or association with a storage engine that can be manually edited, edited through an administrative interface, or automatically changed responsive to system monitoring. In other embodiments, the database monitor 211 itself is configured to determine an optimal storage engine based on the analytics data 213 and other aspects of the data, for example, stored in the database, database collection, or in a document. This determination may be passed to the storage API 208, or otherwise used to map the storage API 208 to a determined storage engine.

The storage API 208 receives database write requests (e.g., from a database API (not shown)) via a network interface 202, and carries out the requested operations by selectively triggering one of the first storage engine 204 and the second storage engine 206. The first storage engine 204 and the second storage engine 206 are executable software modules configured to store database data in the data node 210 in a particular data format. For example, the first storage engine 204 may be configured to store data in a row-store format, and the second storage engine 206 may be configured to store data in a LSM-tree format. In one example, the first storage engine 204 and/or the second storage engine 206 are configured store primary database data (i.e., the data being stored and queried) in a particular data format in the primary data memory 212, and may store database index data in a particular data format in index data memory 214. In one embodiment, the first storage engine 204 and/or the second storage engine 206 are configured store an operation log (referred to as an "oplog") 216 in a particular data format. As discussed in more detail below, a database monitor 211 may track a number of analytics about the database, and the operations performed on it over time, and stores that information as analytics data 213.

One advantage of using the storage API 208 as an abstraction layer between the database API and the storage engines is that the identity and selection of a particular storage engine can be transparent to the database API and/or a user interacting with the database API. For example, the database API may pass a "write" function call to the storage API 208 instructing the storage API to write a particular set of data to the database. The storage API 108 then determines, according to its own analysis and/or user input, which storage engine should perform the write operation. Different storage engines may be appropriate for different types of data stored in different collections that may undergo a variety of different operations. Thus, the choice and implementation of calls to an appropriate storage engine are made by the API 208, freeing the database API calls to simply request a "write" of certain data. This abstraction level allows for the implementation of the system on large filesystems that may be stored across machines in a database cluster, such as the Hadoop Filesystem offered by the Apache Software Foundation.

Another advantage of using the storage API 208 is the ability to add, remove, or modify storage engines without modifying the requests being passed to the API 208. The storage API 208 is configured to identify the available storage engines and select the appropriate one based on one or more factors discussed below. The database API requesting write operations need not know the particulars of the storage engine selection or operation, meaning that storage engines may be embodied in pluggable modules that may be swapped out or modified. Thus, users are able to leverage the same query language, data model, scaling, security and operational tooling across different applications, each powered by different pluggable storage engines.

Figure 3:
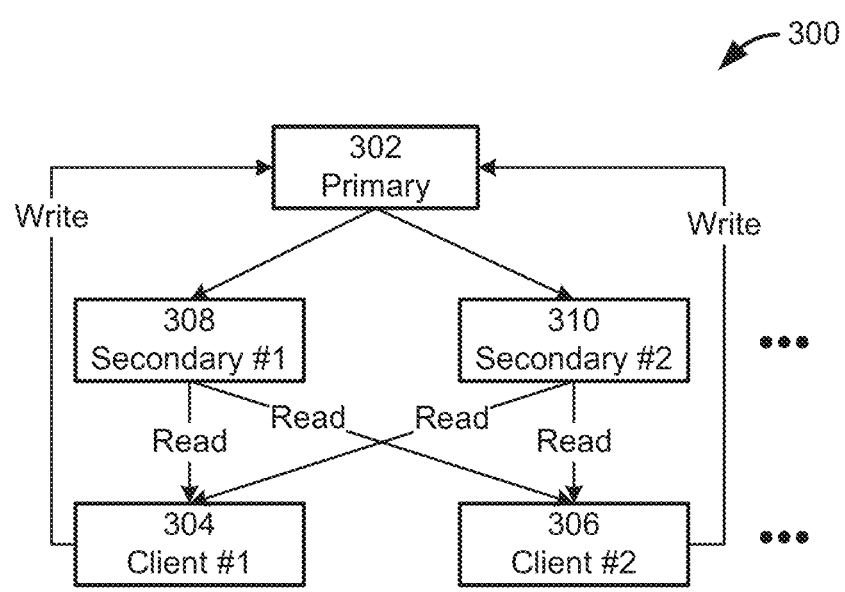
FIG. 3 illustrates a block diagram of an example replica set hosting a distributed database, according to some embodiments.

The embodiment shown and discussed with respect to FIG. 2 depicts a single database node 210. Yet in some embodiments, multiple database nodes may be provided and arranged in a replica set. FIG. 3 shows a block diagram of an exemplary replica set 300. Replica set 300 includes a primary node 302 and one or more secondary nodes 308 and 310, each of which is configured to store a dataset that has been inserted into the database. The primary node 302 may be configured to store all of the documents currently in the database, and may be considered and treated as the authoritative version of the database in the event that any conflicts or discrepancies arise, as will be discussed in more detail below. While two secondary nodes 308, 310 are depicted for illustrative purposes, any number of secondary nodes may be employed, depending on cost, complexity, and data availability requirements. In a preferred embodiment, one replica set may be implemented on a single server. In other embodiments, the nodes of the replica set may be spread among two or more servers.

The primary node 302 and secondary nodes 308, 310 may be configured to store data in any number of database formats or data structures as are known in the art. In a preferred embodiment, the primary node 302 is configured to store documents or other structures associated with non-relational databases. The embodiments discussed herein relate to documents of a document-based database, such as those offered by MongoDB, Inc. (of New York, N.Y. and Palo Alto, Calif.), but other data structures and arrangements are within the scope of the disclosure as well.

In some embodiments, the replica set primary node 302 only accepts write requests (disallowing read requests) from client systems 304, 306 and the secondary nodes 308, 310 only accept reads requests (disallowing write requests) from client systems 304, 306. In such embodiments, the primary node 302 receives and processes write requests against the database, and replicates the operation/transaction asynchronously throughout the system to the secondary nodes 308, 310. In one example, the primary node 302 receives and performs client write operations and generates an oplog. Each logged operation is replicated to, and carried out by, each of the secondary nodes 308, 310, thereby bringing those secondary nodes into synchronization with the primary node 302. In some embodiments, the secondary nodes 308, 310 may query the primary node 302 to receive the operation log and identify operations that need to be replicated. In other embodiments, the operation log may be transmitted from the primary node 302 to the secondary nodes 308, 310 periodically or in response to the occurrence of a predefined condition, such as accruing a threshold number of operations in the operation log that have not yet been sent to the secondary nodes 308, 310. Other implementations can be configured to provide different levels of consistency, and, for example, by restricting read requests. According to one embodiment, read requests can be restricted to systems having up to date data, read requests can also in some settings be restricted to primary systems, among other options.

In some embodiments, both read operations may be permitted at any node (including primary node 302 or secondary nodes 308, 310) and write operations limited to primary nodes in response to requests from clients. The scalability of read operations can be achieved by adding nodes and database instances. In some embodiments, the primary node 302 and/or the secondary nodes 308, 310 are configured to respond to read operation requests by either performing the read operation at that node or by delegating the read request operation to another node (e.g., a particular secondary node 308). Such delegation may be performed based on load-balancing and traffic direction techniques. In other embodiments, read distribution can be managed based on a respective snapshot available at various nodes within a distributed database. For example, the system can determine based on analyzing client requested data what snapshot is associated with the requested data and what node hosts the respective data or snapshot that can be used to provide the requested data. In one example, a data routing processor accesses configuration files for respective replica sets to determine what node can respond to a data request, and further analysis of respective snapshots can determine, for example, what node within a replica set needs to be accessed.

In some embodiments, the primary node 302 and the secondary nodes 308, 310 may operate together to form a replica set 300 that achieves eventual consistency, meaning that replication of database changes to the secondary nodes 308, 310 may occur asynchronously. When write operations cease, all replica nodes of a database will eventually "converge," or become consistent. The eventually consistent model provides for a loose form of consistency. In one particular example, (assuming>3 secondary nodes) client systems (e.g. 304, 306) request write operations: W(x=3); W(x=7); W(x=5). As the replication of the write requests occurs asynchronously, at some point all of the secondary nodes (e.g. 308, 310) will respond to a read request with 5. However, in the short term (during replication operations) client systems randomly reading from secondary nodes can see [read operations designated by R (variable and actual value)]: R(x==7); R(x==0); R(x==5); and R(x==3). In such a configuration, replica set 300 provides eventual consistency and can permit out of order reads (in the short term). Other example implementations can increase the strength of consistency, and for example, can include monotonic read consistency (no out of order reads). Eventual consistency may be a desirable feature where high availability is important, such that locking records while an update is stored and propagated is not an option. In such embodiments, the secondary nodes 308, 310 may handle the bulk of the read operations made on the replica set 300, whereas the primary node 308, 310 handles the write operations. For read operations where a high level of accuracy is important (such as the operations involved in creating a secondary node), read operations may be performed against the primary node 302. In some embodiments, replica set 300 can be configured to perform according to a single writer eventually consistent model.

It will be appreciated that the difference between the primary node 302 and the one or more secondary nodes 308, 310 in a given replica set may be largely the designation itself and the resulting behavior of the node; the data, functionality, and configuration associated with the nodes may be largely identical, or capable of being identical (e.g., secondary nodes can be elevated to primary nodes in the event of failure). Thus, when one or more nodes within a replica set 300 fail or otherwise become available for read and/or write operations, other nodes may change roles to address the failure. For example, if the primary node 302 were to fail, a secondary node 308 may assume the responsibilities of the primary node, allowing operation of the replica set to continue through the outage. This failover functionality is described in U.S. application Ser. No. 12/977,563, the disclosure of which is hereby incorporated by reference in its entirety.

Each node in the replica set 300 may be implemented on one or more server systems. Additionally, one server system can host more than one node. Each server can be connected via a communication device to a network, for example the Internet, and each server can be configured to provide a heartbeat signal notifying the system that the server is up and reachable on the network. Sets of nodes and/or servers can be configured across wide area networks, local area networks, intranets, and can span various combinations of wide area, local area and/or private networks. Various communication architectures are contemplated for the sets of servers that host database instances and can include distributed computing architectures, peer networks, virtual systems, among other options.

The primary node 302 may be connected by a LAN, a WAN, or other connection to one or more of the secondary nodes 308, 310, which in turn may be connected to one or more other secondary nodes in the replica set 300. Connections between secondary nodes 308, 310 may allow the different secondary nodes to communicate with each other, for example, in the event that the primary node 302 fails or becomes unavailable and a secondary node must assume the role of the primary node.

According to one embodiment, a plurality of nodes (e.g., primary nodes and/or secondary nodes) can be organized in groups of nodes in which data is stored and replicated across the nodes of the set. Each group can be configured as a replica set. In another embodiment, one or more nodes are established as primary nodes that host a writable copy of the database. Each primary node can be responsible for a portion of the database, e.g. a database shard. Database sharding breaks up sections of the database into smaller portions based on, for example, ranges of the data. In some implementations, database sharding facilitates scaling a primary-secondary architecture over a large number of nodes and/or large database implementations. In one embodiment, each database shard has one primary node which replicates its data to its secondary nodes. Database shards can employ location preferences. For example, in a database that includes user records, the majority of accesses can come from specific locations. Migrating a shard primary node to be proximate to those requests can improve efficiency and response time. For example, if a shard for user profile includes address information, shards can be based on ranges within the user profiles, including address information. If the nodes hosting the shard and/or the shard primary node are located proximate to those addresses, improved efficiency can result, as one may observe the majority of requests for that information to come from locations proximate to the addresses within the shard.

Figure 4:
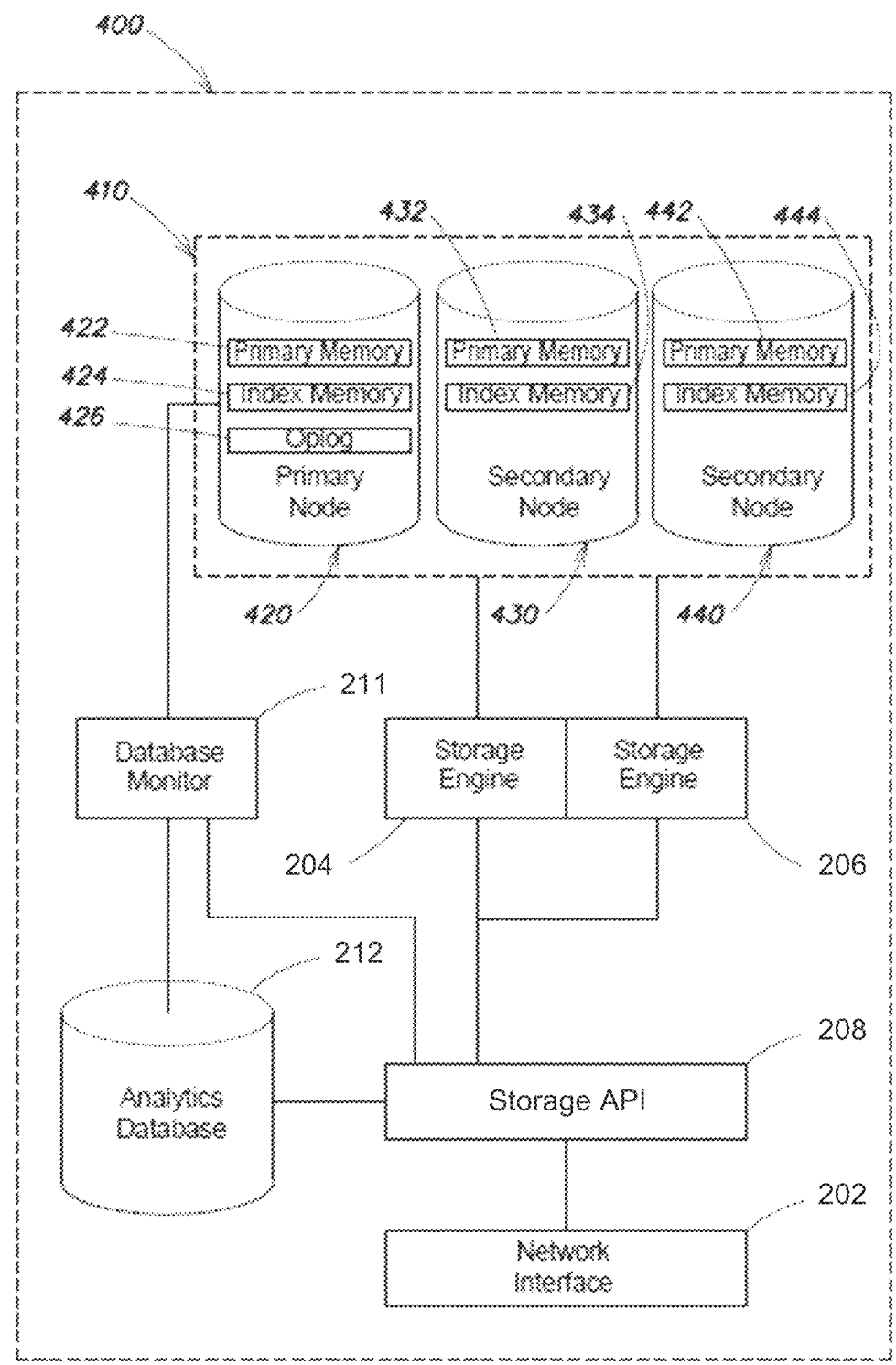
FIG. 4 illustrates a block diagram of another example distributed database system, according to some embodiments.

An example of a database subsystem 400 incorporating a replica set 410 is shown in FIG. 4. As can be seen, database subsystem 400 incorporates many of the elements of database subsystem 200 of FIG. 2 including the network interface 202, the storage engines 204, 206, the storage API 208, the database monitor 211, and the analytics database 212. Relative to the database subsystem 200 shown in FIG. 2, the database subsystem 400 replaces the single node 210 with a replica set 410 comprising primary node 420 and secondary nodes 430 and 440. In one example, the replica set 410 functions in much the same manner as the replica set 300 discussed with respect to FIG. 3. While only two secondary nodes 430 and 440 are shown for illustrative purposes, it will be appreciated that the number of secondary nodes may be scaled up or down as desired or necessary.

In one example, database operation requests directed to the replica set 410 may be processed by the primary node 420 and either performed by the primary node 420 or directed to a secondary node 430, 440 as appropriate. In one embodiment, both read and write operations are permitted at any node (including primary node 420 or secondary nodes 430, 440) in response to requests from clients. The scalability of read operations can be achieved by adding nodes and database instances. In some embodiments, the primary node 420 and/or the secondary nodes 430, 440 are configured to respond to read operation requests by either performing the read operation at that node or by delegating the read request operation to another node (e.g., a particular secondary node 430). Such delegation may be performed based on various load-balancing and traffic direction techniques.

In some embodiments, the database only allows write operations to be performed at the primary node 420, with the secondary nodes 430, 440 disallowing write operations. In such embodiments, the primary node 420 receives and processes write requests against the database, and replicates the operation/transaction asynchronously throughout the system to the secondary nodes 430, 440. In one example, the primary node 420 receives and performs client write operations and generates an oplog. Each logged operation is replicated to, and carried out by, each of the secondary nodes 430, 440, thereby bringing those secondary nodes into synchronization with the primary node 420 under an eventual-consistency model.

In one example, primary database data (i.e., the data being stored and queried) may be stored by one or more data storage engines in one or more data formats in the primary data memory 422, 432, 442 of nodes 420, 430, 440, respectively. Database index data may be stored by one or more data storage engines in one or more data formats in the index data memory 424, 434, 444 of nodes 420, 430, 440, respectively. Oplog data may be stored by a data storage engine in a data format in oplog data memory 426 of node 420.

Example Methods for Restoring Data from Snapshots

As discussed above, various systems may be configured to fully or partially restore data in a dataset to a previous state. The restoration of data to a previous state may be facilitated by the generation of snapshots of the dataset at different points in time on a logical clock. FIG. 5 shows an example snapshot generation process 500 according to some embodiments. The snapshot generation process 500 may be performed by a system (e.g., snapshot component 116 of restore engine 102) to generate snapshots of the data in the dataset. As shown in FIG. 5, the snapshot generation process 500 includes an act 502 of determining whether it is time to take a snapshot, an act 504 of determining whether a snapshot limit has been reached, and an act 506 of taking a snapshot.

In act 502, the system determines whether it is time to take a snapshot. The system may make the determination as to whether it is appropriate to take a snapshot based on a predetermined policy (e.g., a predetermined schedule). For example, the system may periodically or aperiodically capture snapshots of the data. In other examples, the system may change the timing of taking snapshots based on client interaction with the dataset. For example, the system may take snapshots every 10 milliseconds during time periods where the dataset is receiving change requests and pause snapshot generation during periods where no changes to the dataset are taking place. Thereby, the system may reduce the number of snapshots being taken and stored by avoiding multiple successive snapshots that do not include any changes to the dataset. If the system determines that it is an appropriate time to take a snapshot, the system proceeds to act 504 to determine whether a snapshot limit has been reached. Otherwise the snapshot generation process 500 ends.

In act 504, the system determines whether a snapshot limit has been reached. The system may have a predefined maximum number of snapshots that can be maintained at any given time. For example, the system may have a maximum number of snapshots of 10,000. If the snapshot limit has been reached, then process 500 ends. Otherwise, the system proceeds to act 506 and takes a snapshot.

In some embodiments, the generated snapshots may be directly queried in place of (or in combination with) the current data in a dataset. Thereby, a database user may be able to reproduce the results of queries executed on data previously stored in a dataset. FIG. 6 shows an example snapshot query process 600 that may be performed by a system (e.g., restore component 118 of restore engine 102) to execute the snapshot query. As shown in FIG. 6, the snapshot query process 600 includes an act 602 of receiving a snapshot query request, an act 604 of identifying snapshot(s) to query, an act 606 of reconstructing the identified snapshot(s), an act 608 of querying the identified snapshot(s), an act 610 of returning results.

In act 602, the system receives a snapshot query request. The snapshot query request may be received from, for example, a database user or another system. The snapshot query request may comprise, for example, an indication of one or more snapshots to query (e.g., ID numbers associated with the snapshots to query) and/or one or more search criteria indicative of the characteristic(s) of the data that should be returned (e.g., criteria a document should have to be returned). For example, the snapshot query may indicate that a snapshot with an ID number of 2314 should be searched for any documents modified in the last week.

In act 604, the system identifies one or more snapshots to query. The system may identify the one or more snapshots to query based on the contents of the snapshot query. In instances where the snapshots query includes an indication of one or more snapshots to search, the system may identify the one or more snapshots to query consistent with the one or more snapshots identified in the query. In instances where the snapshot query does not include an indication of the snapshot to query, the system may identify one or more snapshots using the search criteria of the query. For example, the search criteria may indicate that only documents that have been modified within the past week should be returned and the system may identify those snapshots that were captured within the last week.

In some embodiments, the snapshots may be stored in a compressed state to reduce the storage requirements of storing the snapshots. For example, de-duplication techniques may be employed to compress the snapshots. In these embodiments, the system may perform act 606 to reconstruct (e.g., de-compress) the identified snapshots. The particular method employed to reconstruct the identified snapshots may depend on, for example, the particular technique employed to compress and/or store the snapshots. For example, the snapshots may be stored as de-duplicated blocks. In this example, the system may identify and retrieve the de-duplicated blocks that correspond to the identified snapshots. In turn, the system may decompress the de-duplicated blocks to form a reconstructed version of the identified snapshots. The reconstructed version of the identified snapshots may be, for example, stored locally in a computer readable medium (such as random access memory (RAM), a hard disk drive, and/or a solid-state drive).

In act 608, the system queries the identified snapshot(s). The system may query the identified snapshot(s) by, for example, triggering a storage engine to execute one or more search operations on the reconstructed snapshot(s). The reconstructed snapshot(s) may be searched to generate query results that comprise, for example, data in the identified snapshots that meets the search criteria specified in the received snapshot query.

In act 610, the system returns the results generated from the query. The system may, for example, output the data (e.g., documents and/or collections) that meets the search criteria specified in the received snapshot query. The data may be output to another system and/or output to a database user (e.g., via a user interface).

Figures 7, 8:
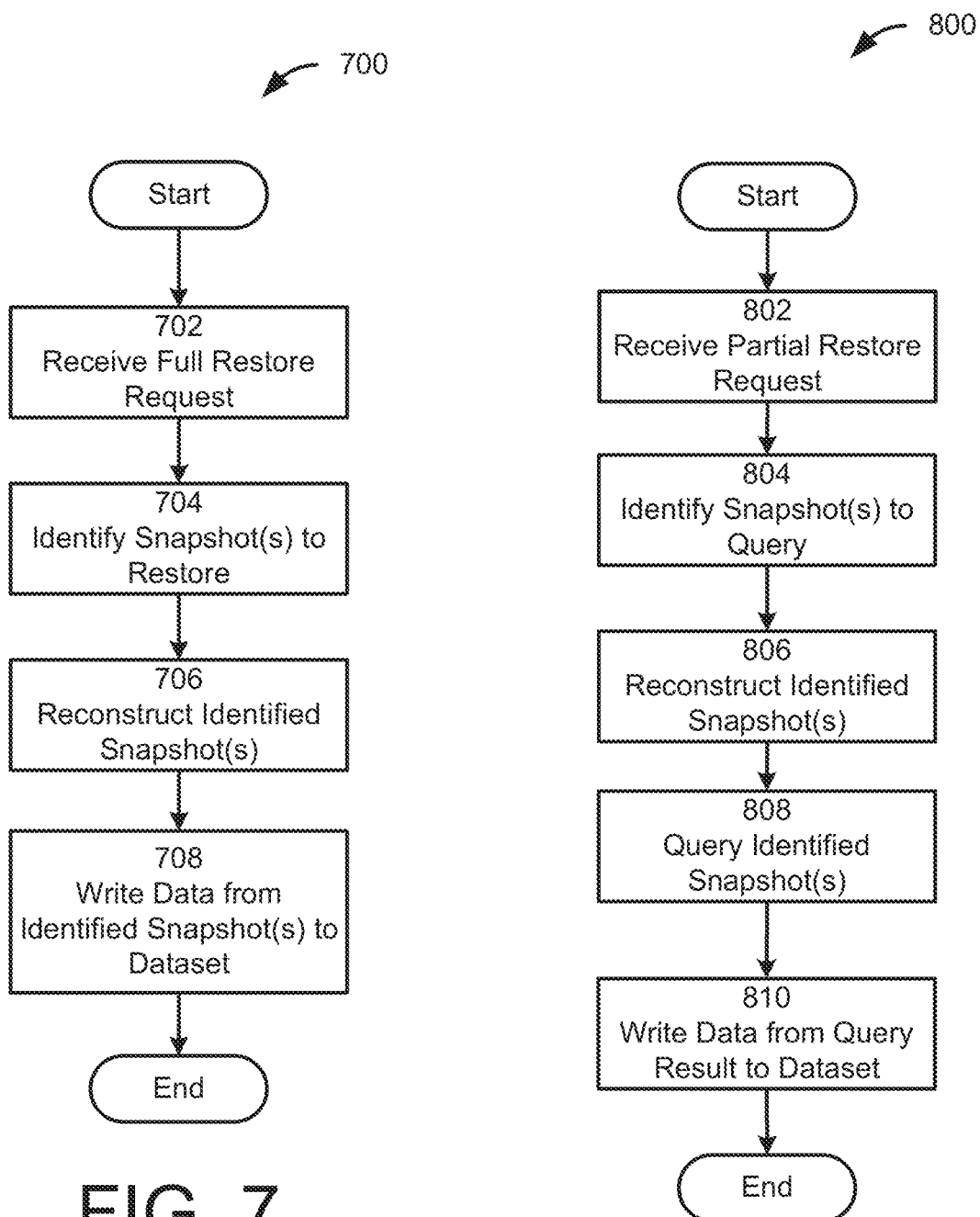
FIG. 7 is a flowchart showing an example a full restore process, according to some embodiments.
FIG. 8 are flowchart showing an example a partial restore process, according to some embodiments.

In some embodiments, the system may be capable of fully restoring the data from a snapshot to a dataset. FIG. 7 shows an example full restore process 700 that may be performed by a system (e.g., restore component 118 in restore engine 102) to execute the full restore. As shown in FIG. 7, the full restore process 700 includes an act 702 of receiving a full restore request, an act 704 of identifying a snapshot to restore, an act 706 of reconstructing the identified snapshot(s), and an act 708 of writing data from the identified snapshot to the dataset.

In act 702, the system receives a full restore request to completely restore the data in the dataset to a previous state. The full restore request may be received from, for example, a database user or a system. The full restore request may comprise an indication of the previous state to which the data in the dataset should be restored. For example, the full restore request may comprise an indication of the particular snapshot(s) to employ in the full restore and/or an indication of a time to which the data should be restored to (e.g., 5 days ago at 12:00 pm). In act 704, the system identifies the snapshot(s) to restore to the dataset. The system may identify the snapshot(s) to restore based on the contents of the full restore request. In instances where the full restore request includes an indication of one or more snapshots to restore, the system may identify the one or more snapshots to restore consistent with the one or more snapshots identified in the full restore request. In instances where the full restore request includes an indication of a previous time to which the data should be restored, the system may identify one or more snapshots that contain data at the previous time. For example, the full restore request may indicate that the data should be restored to a previous state that occurred 5 days ago and the system may identify a snapshot that was captured on the same day (e.g., 5 days ago).

In some embodiments, the snapshots may be stored in a compressed state to reduce the storage requirements of storing the snapshots. For example, deduplication techniques may be employed to compress the snapshots. In these embodiments, the system may perform act 706 to reconstruct (e.g., de-compress) the identified snapshots. The particular method employed to reconstruct the identified snapshots may depend on, for example, the particular technique employed to compress and/or store the snapshots. For example, the snapshots may be stored as de-duplicated blocks. In this example, the system may identify and retrieve the de-duplicated blocks that correspond to the identified snapshots. In turn, the system may decompress the de-duplicated blocks to form a reconstructed version of the identified snapshots. The reconstructed version of the identified snapshots may be, for example, stored locally in a computer readable medium (such as random access memory (RAM), a hard disk drive, and/or a solid-state drive).

In act 708, the system write data from the identified snapshot(s) to the dataset to restore the data to a previous state. The system may write all or any portion of the data from the identified snapshot(s) to the dataset. The system may employ a different storage engine to write the data to the dataset than was employed to reconstruct the identified snapshots.

In some embodiments, the system may be capable of partially restoring the data from a snapshot to a dataset. FIG. 8 shows an example partial restore process 800 that may be performed by a system (e.g., restore component 118 in restore engine 102) to execute the partial restore. As shown in FIG. 8, the partial restore process 800 includes an act 802 of receiving a partial restore request, an act 804 of identifying a snapshot to restore, an act 806 of reconstructing the identified snapshot(s), an act 808 of querying the identified snapshot(s), and an act 810 of writing data from the query results to the dataset.

In act 802, the system receives a partial restore request. The partial restore request may comprise, for example, an indication of the previous state to which the data in the dataset should be restored and/or search criteria indicative of the characteristic(s) of the data that should be restore (e.g., criteria a document should have to be restore). For example, the partial restore request may indicate that all documents that were created 5 days ago and contain one or more of the strings: (1) "banana," (2) "apple," or (3) "pear" should be restored to the dataset.

In act 804, the system identifies one or more snapshots to query. The system may identify the one or more snapshots to query based on the contents of the partial restore request. In instances where the partial restore request includes an indication of one or more snapshots to search, the system may identify the one or more snapshots to query consistent with the one or more snapshots identified in the partial restore request. In instances where the partial restore request includes an indication of a previous time to which the data should be restored, the system may identify one or more snapshots that contain data at the previous time. For example, the partial restore request may indicate that the data should be restored to a previous state that occurred 5 days ago and the system may identify a snapshot that was captured on the same day (e.g., 5 days ago). In instances where the partial restore request does not include any indication of a snapshot to query or a particular time to restore the data to, the system may identify one or more snapshots using the search criteria of the partial restore request. For example, the search criteria may indicate that only documents that have been modified within the past week should be restore and the system may identify those snapshots that were captured within the last week.

In some embodiments, the snapshots may be stored in a compressed state to reduce the storage requirements of storing the snapshots. For example, deduplication techniques may be employed to compress the snapshots. In these embodiments, the system may perform act 806 to reconstruct (e.g., de-compress) the identified snapshots. The particular method employed to reconstruct the identified snapshots may depend on, for example, the particular technique employed to compress and/or store the snapshots. For example, the snapshots may be stored as de-duplicated blocks. In this example, the system may identify and retrieve the de-duplicated blocks that correspond to the identified snapshots. In turn, the system may decompress the de-duplicated blocks to form a reconstructed version of the identified snapshots. The reconstructed version of the identified snapshots may be, for example, stored locally in a computer readable medium (such as random access memory (RAM), a hard disk drive, and/or a solid-state drive).

In act 808, the system queries the identified snapshot(s). The system may query the identified snapshot(s) by, for example, triggering a storage engine to execute one or more search operations on the reconstructed snapshot(s). The reconstructed snapshots may be searched to generate query results that comprise, for example, data in the identified snapshots that meets the search criteria specified in the received snapshot query.

In act 810, the system write data from the query results to the dataset to restore the data to a previous state. The system may write all or any portion of the data from the query results to the dataset. The system may employ a different storage engine to write the data to the dataset than was employed to reconstruct the identified snapshots.

Various inventive concepts may be embodied as one or more processes, of which examples have been provided. The acts performed as part of each process may be ordered in any suitable way. Thus, embodiments may be constructed in which acts are performed in an order different than illustrated, which may include performing some acts simultaneously, even though shown as sequential acts in illustrative embodiments. Further, one or more of the processes may be combined.

Example User Interface

Figure 12:
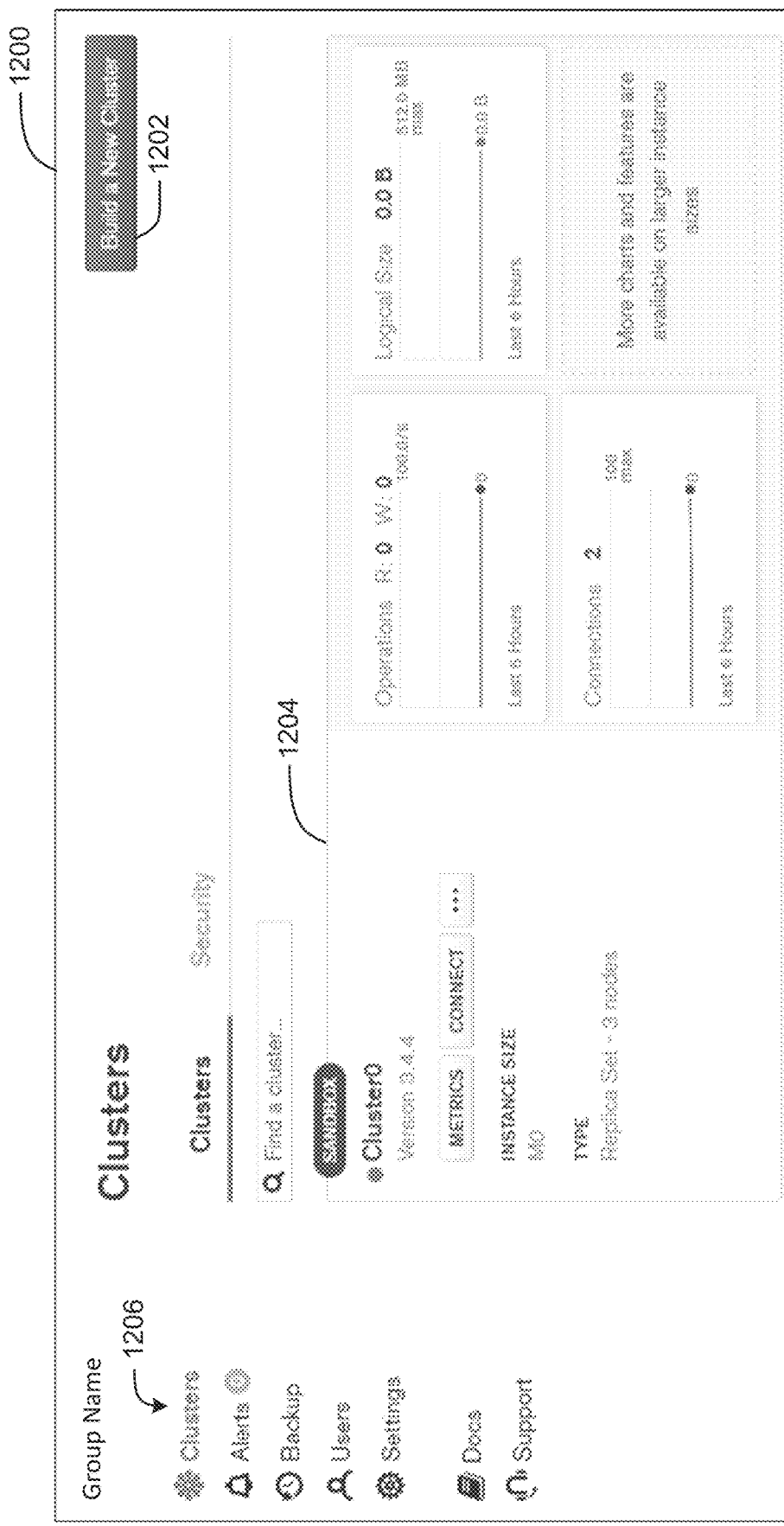
FIG. 12 is a diagram showing an example user interface screen, according to some embodiments.
Figure 13:
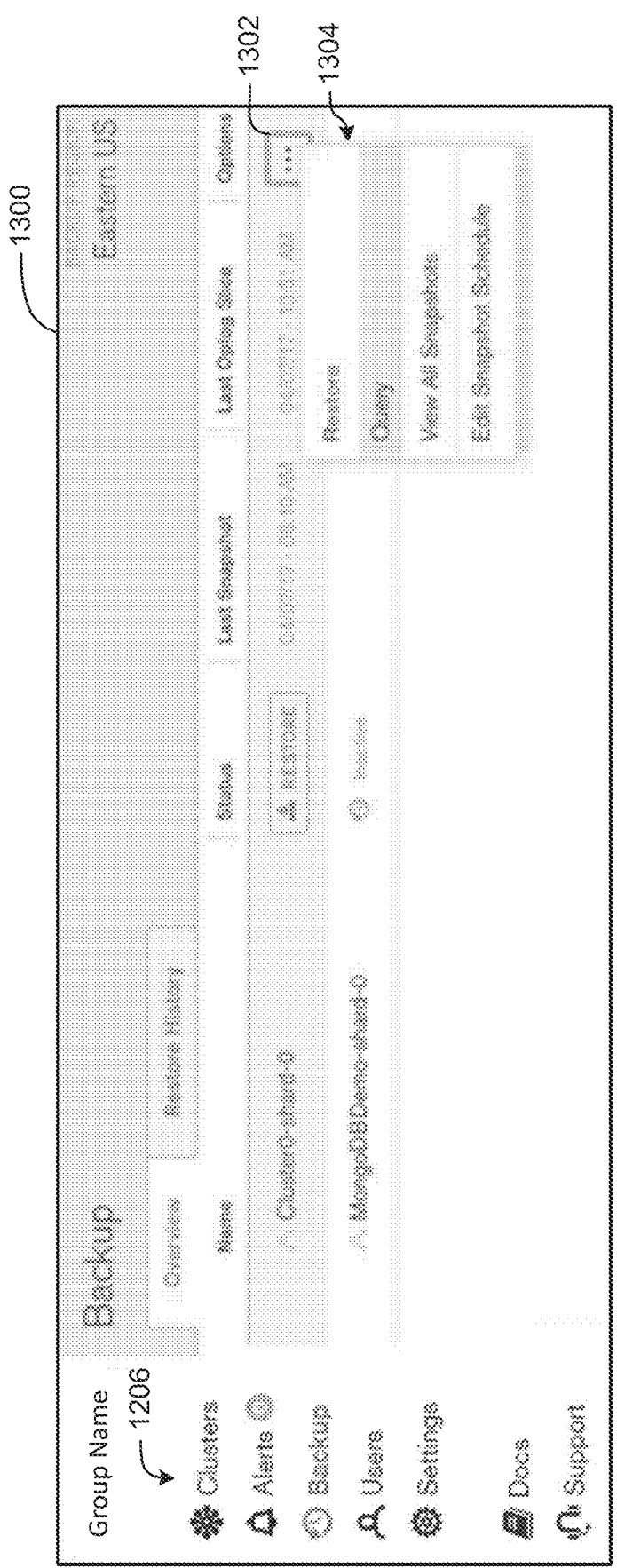
FIG. 13 is a diagram showing another example user interface screen, according to some embodiments.

The database systems, such as database system 100, may provide a user interface with which a database user may interact with the database system. Thereby, a database user may directly submit one or more requests to the database system. For example, the database system may be implemented as a cloud storage system and provide a web-portal that database users may employ to interact with the database system (e.g., initial a snapshot query, initiate a restore request, and/or view snapshot query results). FIGS. 12 and 13 show example user interface screens of such a user interface of a web-portal that are configured to accept a restore request (e.g., a full restore request or a partial restore request) and/or a snapshot query from a database user. In particular, FIG. 12 shows an example cluster screen 1200 that may be displayed when a database user initially logs into the web-portal. The system may store an association between each database user and one or more database clusters (e.g., replica sets) in the cloud storage system. Information regarding a state of the clusters associated with the users may be presented in a cluster information region 1204 (e.g., cluster size, cluster type, cluster operations, and cluster connections). As shown, the cluster screen 1204 also comprises a button 1202 to trigger the system to create a new database cluster (e.g., a new replica set) for the user. The cluster screen 1200 further includes a menu 1206 that permits the user to navigate to other screens including: a cluster screen (e.g., the cluster screen 1200), an alert screen, a backup screen, a user screen, a settings screen, a documentation screen, and a support screen. The system may transition from the cluster screen 1200 to a backup screen 1300 shown in FIG. 13 responsive to selection of the backup element in the menu 1206. As shown, the backup screen 1300 comprises the menu 1206 and a table illustrating the clusters associated with each user in a separate row. In each row, the table may comprise information about the respective cluster and an options button 1302 that, upon selection, opens a pop-up box containing the list of backup options: (1) restore, (2) query, (3) view all snapshots, and (4) edit snapshots schedule. If the restore option is selected, the user interface may present one or more screens to accept information regarding a restore request, such as whether the restore request is a full restore request or a partial restore request. If the query option is triggered, the user interface may present one or more screens to accept information regarding the snapshot query, such as one or more criteria that documents in a snapshot should exhibit to be returned. If the view all snapshots option is selected, the user interface may present one or more screens showing all of the snapshots that have been captured for the cluster and information associated with each snapshot (such as when it was captured). If the edit snapshot schedule option is selected, the user interface may present one or more screens to accept changes regarding the schedule employed to capture snapshots.

It should be appreciated that various alterations may be made to the example user interface screens shown in FIGS. 12 and 13 without departing from the scope of the present disclosure. For example, elements in the user interface may be moved, modified (e.g., renamed), added, and/or deleted.

Example Special-Purpose Computer System

A special-purpose computer system can be specially configured as disclosed herein. According to one embodiment the special-purpose computer system is configured to perform any of the described operations and/or algorithms. The operations and/or algorithms described herein can also be encoded as software executing on hardware that defines a processing component, that can define portions of a special purpose computer, reside on an individual special-purpose computer, and/or reside on multiple special-purpose computers.

Figure 9:
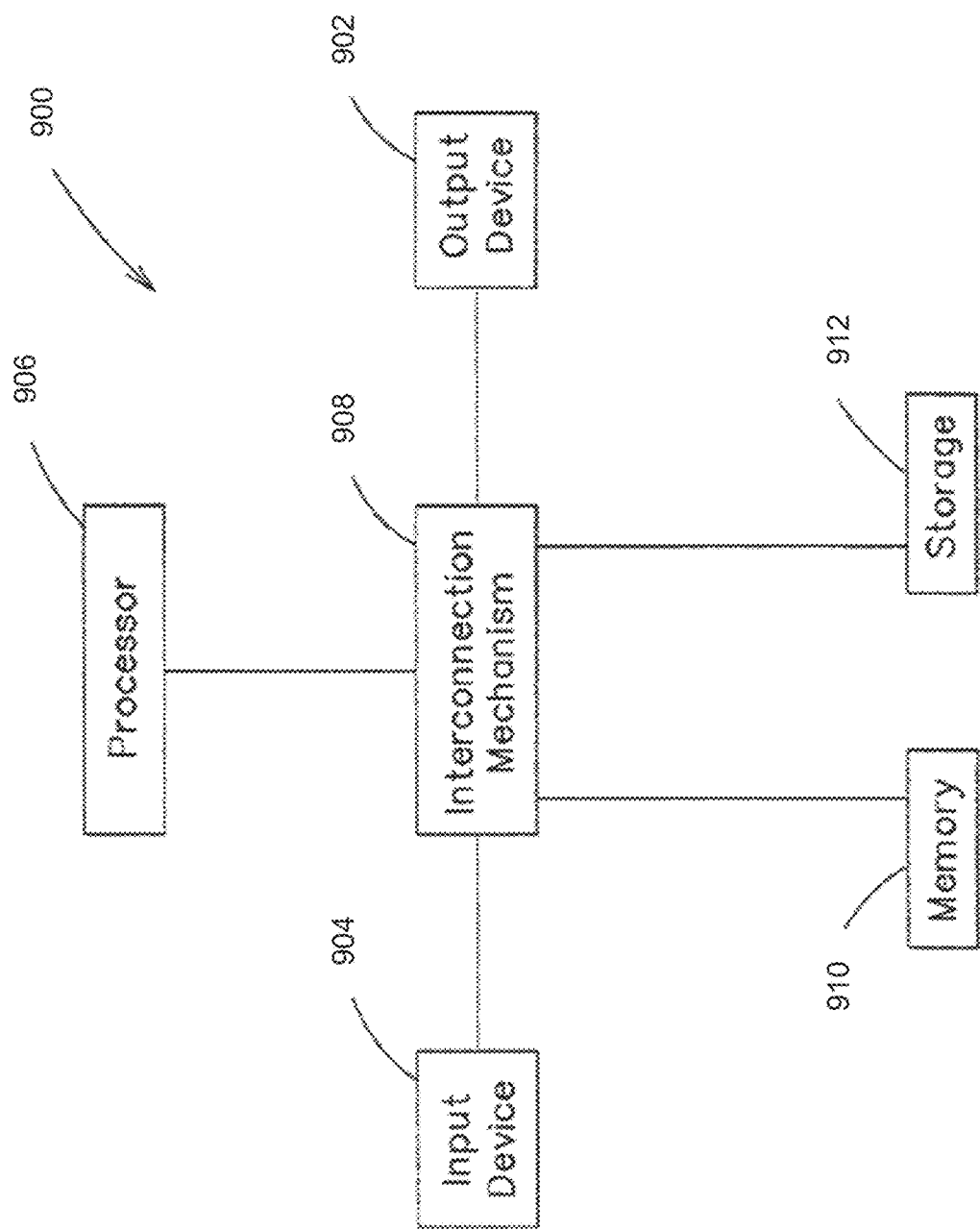
FIG. 9 is a block diagram of an example special-purpose computer system, according to some embodiments.

FIG. 9 shows a block diagram of an example special-purpose computer system 900 on which various aspects of the present invention can be practiced. For example, computer system 900 may include a processor 906 connected to one or more memory devices 910, such as a disk drive, memory, or other device for storing data. Memory 910 is typically used for storing programs and data during operation of the computer system 900. Components of computer system 900 can be coupled by an interconnection mechanism 908, which may include one or more busses (e.g., between components that are integrated within a same machine) and/or a network (e.g., between components that reside on separate discrete machines). The interconnection mechanism enables communications (e.g., data, instructions) to be exchanged between system components of system 900.

Computer system 900 may also include one or more input/output (I/O) devices 902-904, for example, a keyboard, mouse, trackball, microphone, touch screen, a printing device, display screen, speaker, etc. Storage 912, typically includes a computer readable and writeable nonvolatile recording medium in which computer executable instructions are stored that define a program to be executed by the processor or information stored on or in the medium to be processed by the program.

Figure 10:
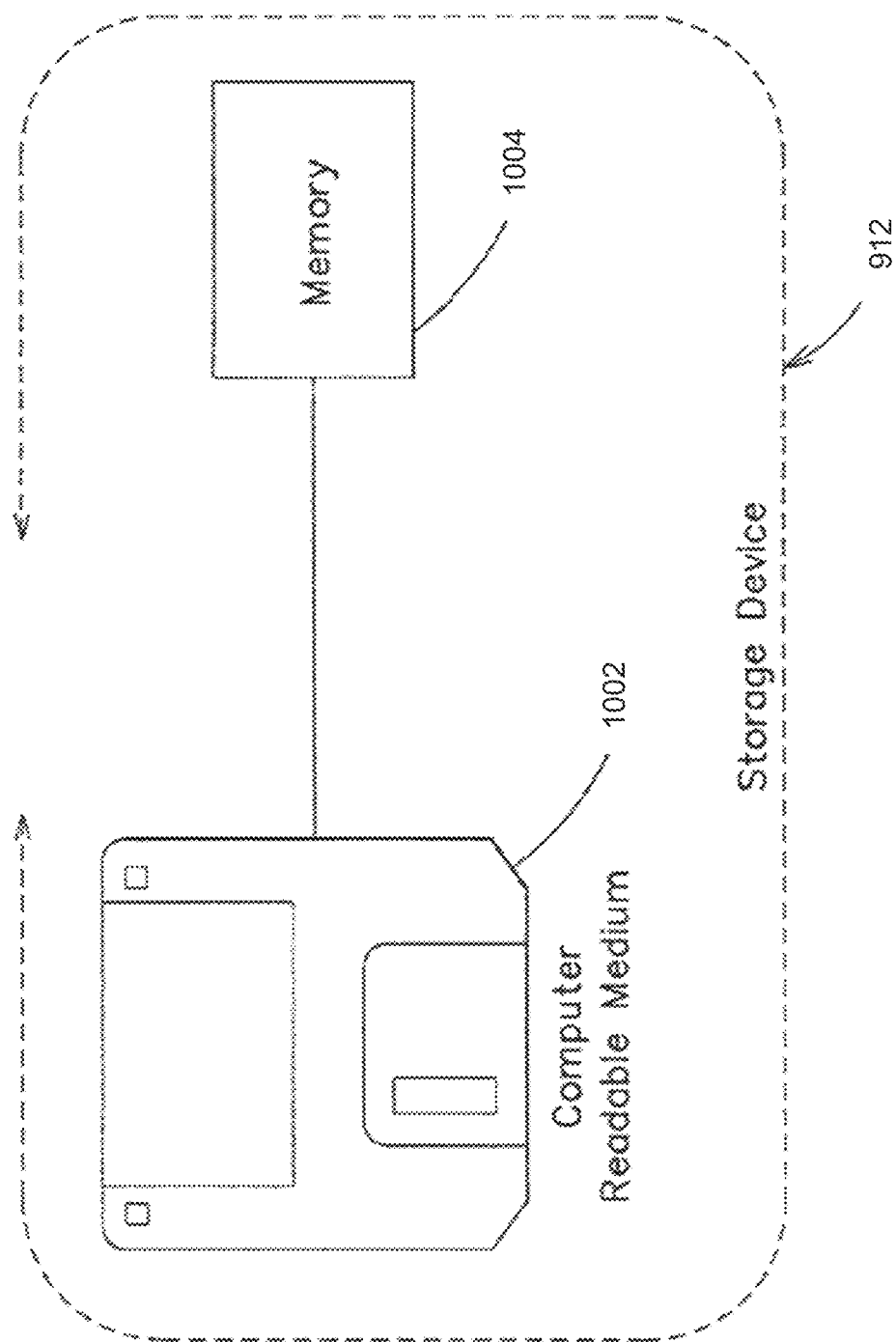
FIG. 10 is a block diagram of an example disk or flash memory, according to some embodiments.

The medium can, for example, be a disk 1002 or flash memory as shown in FIG. 10. Typically, in operation, the processor causes data to be read from the nonvolatile recording medium into another memory 1004 that allows for faster access to the information by the processor than does the medium. This memory is typically a volatile, random access memory such as a dynamic random access memory (DRAM) or static memory (SRAM). According to one embodiment, the computer-readable medium comprises a non-transient storage medium on which computer executable instructions are retained.

Referring again to FIG. 9, the memory can be located in storage 912 as shown, or in memory system 910. The processor 906 generally manipulates the data within the memory 910, and then copies the data to the medium associated with storage 912 after processing is completed. A variety of mechanisms are known for managing data movement between the medium and integrated circuit memory element and the invention is not limited thereto. The invention is not limited to a particular memory system or storage system.

The computer system may include specially-programmed, special-purpose hardware, for example, an application-specific integrated circuit (ASIC). Aspects of the invention can be implemented in software, hardware or firmware, or any combination thereof. Although computer system 900 is shown by way of example, as one type of computer system upon which various aspects of the invention can be practiced, it should be appreciated that aspects of the invention are not limited to being implemented on the computer system as shown in FIG. 9. Various aspects of the invention can be practiced on one or more computers having a different architectures or components than that shown in FIG. 9.

It should be appreciated that the invention is not limited to executing on any particular system or group of systems. Also, it should be appreciated that the invention is not limited to any particular distributed architecture, network, or communication protocol.

Various embodiments of the invention can be programmed using an object-oriented programming language, such as Java, C++, Ada, or C # (C-Sharp). Other programming languages may also be used. Alternatively, functional, scripting, and/or logical programming languages can be used. Various aspects of the invention can be implemented in a non-programmed environment (e.g., documents created in HTML, XML or other format that, when viewed in a window of a browser program, render aspects of a graphical-user interface (GUI) or perform other functions). The system libraries of the programming languages are incorporated herein by reference. Various aspects of the invention can be implemented as programmed or non-programmed elements, or any combination thereof.

Figure 11:
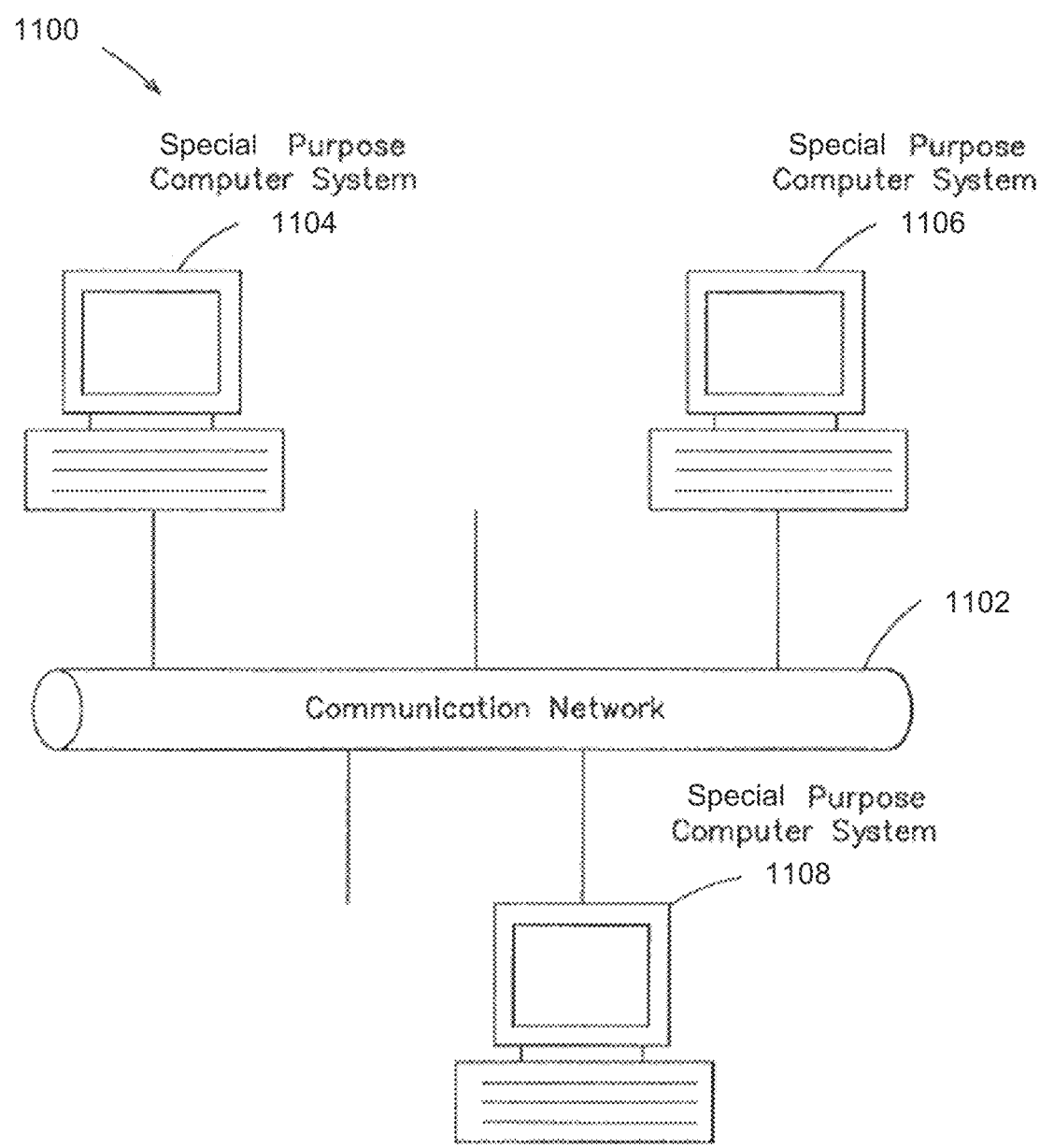
FIG. 11 is a block diagram of an example a distributed system, according to some embodiments.

Various aspects of this invention can be implemented by one or more systems similar to system 1100 shown in FIG. 11. For instance, the system can be a distributed system (e.g., client server, multi-tier system) that includes multiple special-purpose computer systems. In one example, the system includes software processes executing on a system associated with hosting database services, processing operations received from client computer systems, interfacing with APIs, receiving and processing client database requests, routing database requests, routing targeted database request, routing global database requests, determining global a request is necessary, determining a targeted request is possible, verifying database operations, managing data distribution, replicating database data, migrating database data, identifying committed data, etc. These systems can also permit client systems to request database operations transparently, with various routing processes handling and processing requests for data as a single interface, where the routing processes can manage data retrieval from database partitions, merge responses, and return results as appropriate to the client, among other operations.

There can be other computer systems that perform functions such as hosting replicas of database data, with each server hosting database partitions implemented as a replica set, among other functions. These systems can be distributed among a communication system such as the Internet. One such distributed network, as discussed below with respect to FIG. 11, can be used to implement various aspects of the invention. Various replication protocols can be implemented, and in some embodiments, different replication protocols can be implemented, with the data stored in the database replication under one model, e.g., asynchronous replication of a replica set, with metadata servers controlling updating and replication of database metadata under a stricter consistency model, e.g., requiring two phase commit operations for updates.

FIG. 11 shows an architecture diagram of an example distributed system 1100 suitable for implementing various aspects of the invention. It should be appreciated that FIG. 11 is used for illustration purposes only, and that other architectures can be used to facilitate one or more aspects of the invention.

System 1100 may include one or more specially configured special-purpose computer systems 1104, 1106, and 1108 distributed among a network 1102 such as, for example, the Internet. Such systems may cooperate to perform functions related to hosting a partitioned database, managing database metadata, monitoring distribution of database partitions, monitoring size of partitions, splitting partitions as necessary, migrating partitions as necessary, identifying sequentially keyed collections, optimizing migration, splitting, and rebalancing for collections with sequential keying architectures.

CONCLUSION

Having thus described several aspects and embodiments of this invention, it is to be appreciated that various alterations, modifications and improvements will readily occur to those skilled in the art. Such alterations, modifications, and improvements are intended to be part of this disclosure, and are intended to be within the spirit and scope of the invention. Accordingly, the foregoing description is by way of example only.

Use of ordinal terms such as "first," "second," "third," "a," "b," "c," etc., in the claims to modify or otherwise identify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A system comprising:
a database comprising a replica set configured to store a dataset and a plurality of snapshots of at least some data in the dataset and follow an eventual consistency model, wherein the replica set comprises a primary data storage node that includes an operation log and at least one secondary data storage node configured to retrieve the operation log and replicate operations in the operation log;
at least one processor configured to:
receive a first restore request to restore a portion of the dataset to a first previous state, the first restore request comprising a query specifying criteria for data objects of the portion of the dataset; and
responsive to receipt of the first restore request,
identify at least one first snapshot from the plurality of snapshots of at least some data in the dataset to read based on the first restore request, wherein the first snapshot is compressed and stored in a compressed form;
access a configuration file associated with the replica set;
determine, based on the configuration file, whether the primary data storage node or the secondary storage node comprises the identified at least one first snapshot of the plurality of snapshots;
decompress the identified at least one snapshot stored in the compressed form;
execute the query on the identified at least one first snapshot to generate query results comprising one or more data objects from the at least one first snapshot meeting the criteria specified by the query, wherein the executing the query comprises, based on the determination, executing the query using either the primary data storage node or the secondary data storage node; and
write the one or more data objects, generated from the execution of the query on the identified at least one first snapshot, to the dataset to restore the portion of the dataset to the first previous state.

2. The system of claim 1, wherein the at least one processor is further configured to generate the plurality of snapshots.

3. The system of claim 2, wherein the at least one processor is further configured to generate a new snapshot of the dataset periodically.

4. The system of claim 1, wherein the at least one processor is configured to: receive a second restore request to restore the entire dataset to a second previous state; and responsive to receipt of the second restore request, identify at least one second snapshot from the plurality of snapshots to read based on the second restore request; and write data in the identified at least one second snapshot to the dataset to restore the entire dataset to a second previous state.

5. The system of claim 1, wherein each snapshot of the plurality of snapshots corresponds to data stored in the dataset at a unique point in time.

6. The system of claim 1, wherein the at least one processor is configured to: receive a snapshot query requesting information in a second previous state of the dataset; and responsive to receipt of the snapshot query, execute a query on at least one second snapshot from the plurality of snapshots to generate query results; and return the query results.

7. The system of claim 1, wherein the plurality of snapshots are stored in at least one database in a read-only format.

8. The system of claim 1, wherein the at least one processor is configured to access the plurality of snapshots using a first storage engine and access the dataset using a second storage engine that is different from the first storage engine.

9. A method of performing operations in at least one computer database, comprising:
- storing, in the at least one computer database, a dataset and a plurality of snapshots of at least some data in the dataset, wherein the at least one computer database comprises a replica set configured to store the dataset and the plurality of snapshots and follow an eventual consistency model, and the replica set comprises a primary data storage node that includes an operation log and at least one secondary data storage node configured to retrieve the operation log and replicate operations in the operation log;
- receiving, by at least one processor coupled to the at least one computer database, a first request to restore a portion of the dataset to a first previous state, the first restore request comprising a query specifying criteria for data objects of the portion of the dataset; and
- responsive to receiving the first restore request,
  - identifying at least one first snapshot from the plurality of snapshots of at least some data in the dataset to read based on the first restore request, wherein the first snapshot is compressed and stored in a compressed form;
  - accessing a configuration file associated with the replica set;
  - determining, based on the configuration file, whether the primary data storage node or the secondary storage node comprises the identified at least one first snapshot of the plurality of snapshots;
  - decompressing the identified at least one snapshot stored in the compressed form;
  - executing the query on the identified at least one first snapshot to generate query results comprising one or more data objects from the at least one first snapshot meeting the criteria specified by the query, wherein the executing the query comprises, based on the determination, executing the query using either the primary data storage node or the secondary data storage node; and
  - writing a portion of the data in the identified at least one first snapshot to the dataset to restore the portion of the dataset to the first previous state.

10. The method of claim 9, further comprising generating the plurality of snapshots.

11. The method of claim 10, further comprising generating new snapshots of the dataset periodically.

12. The method of claim 9, further comprising: receiving a second restore request to restore entire dataset to a second previous state; and responsive to receiving the second restore request, identifying at least one second snapshot from the plurality of snapshots to read based on the second restore request; and writing data in the identified at least one second snapshot to the dataset to restore the entire dataset to a second previous state.

13. The method of claim 9, wherein each snapshot of the plurality of snapshots corresponds to data stored in the dataset at a unique point in time.

14. The method of claim 9, further comprising: receiving a snapshot query requesting information in a second previous state of the dataset; and responsive to receiving the snapshot query, executing a query on at least one second snapshot from the plurality of snapshots to generate query results; and returning the query results.

15. The method of claim 9, wherein storing the dataset comprises storing the dataset in a primary data storage node and replicating the dataset in at least one secondary data storage node.

16. A database system comprising:
- a first database comprising at least one replica set configured to store a dataset in the at least one replica set and follow an eventual consistency model, wherein the at least one replica set comprises a primary data storage node that includes an operation log and at least one secondary data storage node configured to retrieve the operation log and replicate operations in the operation log; and
- a second database configured to store a plurality of snapshots of at least some data in the dataset, wherein the plurality of snapshots are compressed and stored in a compressed form; and
- at least one processor coupled to the first and second databases and configured to:
  - receive a restore request comprising a query to restore a portion of the dataset that matches the query to a previous state, wherein the query specifies criteria for data objects of the portion of the dataset; and
  - responsive to receipt of the restore request,
    - identify at least one snapshot from the plurality of snapshots to read based on the restore request;
    - access a configuration file associated with the replica set;
    - determine, based on the configuration file, whether the primary data storage node or the secondary storage node comprises the identified at least one first snapshot of the plurality of snapshots;
    - decompress the identified at least one snapshot stored in the compressed form;
    - execute, using a first storage engine, the query on the decompressed at least one snapshot to generate query results comprising one or more data objects from the identified at least one first snapshot meeting the criteria specified by the query, wherein the executing the query comprises, based on the determination, executing the query using either the primary data storage node or the secondary data storage node; and
    - write, using a second storage engine that is different from the first storage engine, at least some of the query results to the dataset to restore the portion of the dataset that matches the query to the previous state.

* * * * *